(12) United States Patent
Masunari et al.

(10) Patent No.: US 11,628,464 B2
(45) Date of Patent: Apr. 18, 2023

(54) INKJET APPLICATION DEVICE AND DEVICE FOR MANUFACTURING BATTERY

(71) Applicant: KABUSHIKI KAISHA ISHII HYOKI, Hiroshima (JP)

(72) Inventors: Seiji Masunari, Hiroshima (JP); Mikio Kuwada, Hiroshima (JP); Yoshinori Murakami, Hiroshima (JP); Tomoko Hosokawa, Hiroshima (JP); Takahiro Ikegami, Hiroshima (JP); Hideyuki Nakatani, Hiroshima (JP); Mamoru Baba, Iwate (JP)

(73) Assignee: KABUSHIKI KAISHA ISHII HYOKI, Hiroshima (JP)

( * ) Notice: Subject to any disclaimer, the term of this patent is extended or adjusted under 35 U.S.C. 154(b) by 850 days.

(21) Appl. No.: 16/500,156

(22) PCT Filed: Dec. 25, 2017

(86) PCT No.: PCT/JP2017/046387
§ 371 (c)(1),
(2) Date: Oct. 2, 2019

(87) PCT Pub. No.: WO2018/185985
PCT Pub. Date: Oct. 11, 2018

(65) Prior Publication Data
US 2021/0121909 A1    Apr. 29, 2021

(30) Foreign Application Priority Data
Apr. 5, 2017  (JP) .............................. JP2017-075335

(51) Int. Cl.
*H01M 4/04*     (2006.01)
*B41J 2/19*     (2006.01)
(Continued)

(52) U.S. Cl.
CPC .............. *B05C 11/10* (2013.01); *B05C 5/027* (2013.01); *B41J 2/17563* (2013.01);
(Continued)

(58) Field of Classification Search
None
See application file for complete search history.

(56) References Cited

U.S. PATENT DOCUMENTS

| 5,916,628 A | 6/1999 | Ueyama et al. |
| 2015/0314607 A1 | 11/2015 | Moriguchi et al. |
| 2016/0248076 A1 | 8/2016 | Sugihara et al. |

FOREIGN PATENT DOCUMENTS

| CN | 105914342 | 8/2016 |
| JP | 9-213310 | 8/1997 |

(Continued)

OTHER PUBLICATIONS

International Search Report dated Feb. 6, 2018 in International (PCT) Application No. PCT/JP2017/046387.
(Continued)

*Primary Examiner* — Tracy M Dove
(74) *Attorney, Agent, or Firm* — Wenderoth, Lind & Ponack, L.L.P.

(57) ABSTRACT

Provided is an inkjet application device (1) including a distribution flow path for the liquid material, the distribution flow path including a first flow channel (4) configured to supply the liquid material pumped with a pump (2) to a supply tank (3) and a second flow channel (6) configured to supply the liquid material in the supply tank (3) to the inkjet head (5), wherein the supply tank (3) accommodates a filter (40), which is configured to allow the particles in the liquid material to pass therethrough without allowing air bubbles in the liquid material, which are generated by the pumping of the pump (2), to pass therethrough.

20 Claims, 15 Drawing Sheets

(51) Int. Cl.
    *B41J 2/175*     (2006.01)
    *B05C 11/10*     (2006.01)
    *B05C 5/02*     (2006.01)
    *B41J 11/00*     (2006.01)
    *H01M 4/139*     (2010.01)
    *H01M 10/0562*     (2010.01)
    *H01M 10/0585*     (2010.01)
    *H01M 4/134*     (2010.01)

(52) U.S. Cl.
    CPC ............. *B41J 2/17596* (2013.01); *B41J 2/19* (2013.01); *B41J 11/002* (2013.01); *H01M 4/04* (2013.01); *H01M 4/0402* (2013.01); *H01M 4/0419* (2013.01); *H01M 4/134* (2013.01); *H01M 4/139* (2013.01); *H01M 10/0562* (2013.01); *H01M 10/0585* (2013.01)

(56) References Cited

FOREIGN PATENT DOCUMENTS

| | | |
|---|---|---|
| JP | 2001-250583 | 9/2001 |
| JP | 2008-643 | 1/2008 |
| JP | 2008-53103 | 3/2008 |
| JP | 2012-66195 | 4/2012 |
| JP | 2016-010786 | 1/2016 |
| KR | 101633220 | 6/2016 |

OTHER PUBLICATIONS

International Preliminary Report on Patentability and Written Opinion of the International Searching Authority dated Oct. 8, 2019 in International (PCT) Application No. PCT/JP2017/046387.
Office Action dated Dec. 31, 2020 in corresponding Chinese Patent Application No. 201780089328.7, with English Translation of Search Report.

INKJET APPLICATION DEVICE AND DEVICE FOR MANUFACTURING BATTERY

TECHNICAL FIELD

The present invention relates to an inkjet application device configured to apply a liquid material having particles dispersed therein through use of an inkjet head, and a battery manufacturing apparatus configured to form an active material layer and a solid electrolyte layer through use of the inkjet application device.

BACKGROUND ART

As is well known, along with the rapid spread of portable electronic devices and related devices thereof in recent years, various batteries serving as power sources for those devices have been developed or put into practical use. Of those batteries, a lithium battery has been developed as a dischargeable secondary battery. A current mainstream is a lithium battery using a liquid electrolyte. However, after that, there has been developed an all-solid-state lithium battery using a solid electrolyte, which has high safety and can be downsized and reduced in weight.

A liquid-based lithium battery basically has a structure in which a liquid electrolyte solution is sandwiched between an electrode sheet formed of a positive electrode current collector layer and a positive electrode active material layer and an electrode sheet formed of a negative electrode current collector layer and a negative electrode active material layer. In addition, the all-solid-state lithium battery basically has a laminate structure in which a positive electrode current collector layer, a positive electrode active material layer, a solid electrolyte layer, a negative electrode active material layer, and a negative electrode current collector layer are arrayed in the stated order (see, for example, Patent Literature 1). Any of the liquid-based lithium battery and the all-solid-state lithium battery may have a structure using a separator, which is configured to prevent a short-circuit between a positive electrode and a negative electrode, in any one or both of a region between the positive electrode active material layer and the solid electrolyte layer and a region between the negative electrode active material layer and the solid electrolyte layer.

As a procedure for manufacturing those types of lithium batteries, there has been known a procedure involving applying a liquid material for forming a positive electrode or negative electrode active material layer or a liquid material for forming a solid electrolyte layer through adoption of an inkjet system and solidifying the liquid material by drying or the like.

In this case, particles of a raw material for an active material are dispersed in the liquid material for forming the active material layer, and particles of a raw material for an inorganic solid electrolyte are dispersed in the liquid material for forming the solid electrolyte later.

Of various liquid materials that may be applied through adoption of the inkjet system in the future, for example, in a liquid material containing barium titanate or nickel ultra-fine powder that can be used in the field of a multilayer ceramic capacitor (MLCC) or the like and an adhesive containing silica or the like that can be used in the fields of a semiconductor package, a printed wiring board, and the like, particles are dispersed in the liquid material.

Meanwhile, as disclosed in, for example, Patent Literature 2, an inkjet application device configured to apply a liquid material through adoption of the inkjet system includes a distribution flow path for the liquid material including a first flow channel configured to supply the liquid material pumped with a pump to a supply tank and a second flow channel configured to supply the liquid material in the supply tank to an inkjet head.

CITATION LIST

Patent Literature 1: JP 2001-250583 A
Patent Literature 2: JP 2016-10786 A

SUMMARY OF INVENTION

Technical Problem

In the related-art inkjet application device in the above-mentioned illustration, air bubbles are generated when the liquid material is pumped with the pump, and the liquid material having the air bubbles mixed therein is urged to flow into the inkjet head from the supply tank through the second flow channel after being supplied to the supply tank through the first flow channel.

In this case, when particles are dispersed in the liquid material as in the above-mentioned illustration, the particles and the air bubbles are mixed in the liquid material supplied to the supply tank through the first flow channel. When such state is left, it becomes difficult to appropriately apply the liquid material having the particles dispersed therein through use of the inkjet head.

From the above-mentioned viewpoint, the present invention has a technical object to enable the liquid material having the particles dispersed therein to be appropriately applied through use of the inkjet head by preventing the liquid material supplied to the supply tank of the inkjet application device from flowing into the inkjet head under a state in which the air bubbles and the particles are mixed.

Solution to Problem

According to the present invention having been devised to solve the above-mentioned problem, there is provided an inkjet application device configured to apply a liquid material having particles dispersed therein through use of an inkjet head, the inkjet application device comprising a distribution flow path for the liquid material, the distribution flow path comprising a first flow channel configured to supply the liquid material pumped with a pump to a supply tank and a second flow channel configured to supply the liquid material in the supply tank to the inkjet head, wherein the supply tank accommodates a filter, which is configured to allow the particles in the liquid material to pass therethrough without allowing air bubbles in the liquid material, which are generated by the pumping of the pump, to pass therethrough.

With the above-mentioned configuration, even when the liquid material having the particles and the air bubbles mixed therein is supplied to the supply tank through the first flow channel, the filter accommodated in the supply tank allows only the particles to pass therethrough. Therefore, the air bubbles do not flow out from the supply tank to the second flow channel, and hence the liquid material having the particles dispersed therein is appropriately applied through use of the inkjet head.

In this case, the inkjet application device may further comprise a third flow channel configured to feed back the liquid material supplied to the inkjet head through the second flow channel to a feedback tank and a fourth flow channel configured to supply the liquid material from the feedback tank to the pump, to thereby form a circulation path for the liquid material, and further comprise a negative pressure generator configured to apply a negative pressure to the feedback tank.

With this, the liquid material supplied from the supply tank to the inkjet head through the second flow channel is returned to the feedback tank through the third flow channel, and the returned liquid material is supplied to the pump through the fourth flow channel. Therefore, the liquid material is again supplied from the pump to the supply tank through the first flow channel. As a result, the liquid material is circulated while passing through the inside of the inkjet head. Thus, even when the liquid material is not discharged from the inkjet head, the liquid material is circulated, and hence the liquid material flows all the time. Therefore, sedimentation and aggregation of the particles, which may occur when the liquid material stops flowing, can be prevented. Further, when the particles are sedimented and aggregated, it becomes difficult to discharge the liquid material from a nozzle of the inkjet head under a state in which the particles are uniformly dispersed, and discharge abnormality occurs. However, in the inkjet application device, sedimentation and aggregation of the particles can be prevented, and hence discharge abnormality is less liable to occur. In addition, a negative pressure is applied to the feedback tank from the negative pressure generator. Therefore, when the liquid material passes through the inside of the inkjet head, the magnitude of a back pressure of the nozzle can be made appropriate with the above-mentioned negative pressure. With this, the shape of a meniscus of the nozzle can be satisfactorily maintained.

In the above-mentioned configuration, a pipe forming the first pipe is inserted up to a middle of an internal space of the supply tank in a vertical direction. In the supply tank, a vertical length of the internal space is larger than an inner diameter of the supply tank. When an inner diameter of the pipe is represented by d1, and the inner diameter of the supply tank is represented by d2, d2/d1 may be set to fall within a range of from 2 to 6.

With this, the supply tank has a thin and long shape elongated in the vertical direction. Therefore, the flow-through speed of the liquid material having the particles dispersed therein in the supply tank is increased, and the flow is less liable to stagnate. Further, d2/d1 that indicates the ratio between the inner diameter d2 of the supply tank and the inner diameter d1 of the pipe is set to fall within a range of from 2 to 6, and hence the supply tank becomes thinner with respect the pipe, as compared to the related art. Also with this, the flow of the liquid material having the particles dispersed therein is less liable to stagnate. The supply tank with a thin and long shape, which is elongated in the vertical direction, having the above-mentioned effect further has an advantage in that the supply tank is adaptable with a small liquid amount and a simple structure without a stirring mechanism using a rotary vane or the like. Here, when the ratio d2/d1 is less than 2, the flow channel area of the supply tank becomes excessively small with respect to the flow channel area of the pipe, with the result that it becomes difficult to appropriately store the liquid material in the supply tank. Meanwhile, when the ratio d2/d1 is more than 6, the flow channel area of the supply tank becomes excessively large with respect to the flow channel area of the pipe, with the result that the flow of the liquid material having the particles dispersed therein is more liable to stagnate. Thus, as long as the ratio d2/d1 falls within a range of from 2 to 6, such defect can be avoided. From the above-mentioned viewpoint, it is more preferred that the ratio d2/d1 be set to fall within a range of from 3.5 to 4.5.

In the above-mentioned configuration, when the inner diameter of the supply tank is represented by d2, and the vertical length of the internal space of the supply tank is represented by L1, L1/d2 may be set to fall within a range of from 4 to 12.

With this, when the ratio L1/d2 is less than 4, the supply tank does not have a sufficiently thin and long shape, with the result that the flow of the liquid material having the particles dispersed therein is more liable to stagnate. When the ratio L1/d2 is more than 12, the supply tank becomes excessively thin, with the result that the supply tank cannot sufficiently play a role of storing the liquid material. Thus, as long as the ratio L1/d2 falls within a range of from 4 to 12, such defect is less liable to occur. From the above-mentioned viewpoint, it is more preferred that the ratio L1/d2 be set to fall within a range of from 6.5 to 10.5.

In the above-mentioned configuration, when the inner diameter of the supply tank is represented by d2, and a height of a liquid surface of the liquid material in the internal space of the supply tank is represented by L2, L2/d2 may be set to fall within a range of from 1.5 to 9.

With this, when the ratio L2/d2 is less than 1.5, the storage volume of the liquid material in the supply tank becomes excessively relatively small, with the result that the supply tank cannot sufficiently play a role as the tank. When the ratio L2/d2 is more than 9, the storage volume of the liquid material in the supply tank becomes excessively relatively large, with the result that the flow of the liquid material having the particles dispersed therein is more liable to stagnate. Thus, as long as the ratio L2/d2 falls within a range of from 1.5 to 9, such defect is less liable to occur. From the above-mentioned viewpoint, it is more preferred that the ratio L2/d2 be set to fall within a range of from 3 to 5. When the vertical length of the internal space of the supply tank is represented by L1, it is preferred that L2/L1 be set to fall within a range of from 0.3 to 0.6.

In the above-mentioned configuration, the filter may comprise a cylindrical mesh filter, which is accommodated in the internal space of the supply tank, and into which the liquid material supplied to the supply tank through the first flow channel flows, and the cylindrical mesh filter may be configured to prevent the air bubbles in the liquid material from flowing out from an inner portion of the cylindrical mesh filter and cause the particles in the liquid material to flow out from the inner portion of the cylindrical mesh filter.

With this, the trapping of the air bubbles in the liquid material and the passage of the particles therein are ensured in the supply tank, and the liquid material having the particles dispersed therein can be more appropriately applied through use of the inkjet head.

In the above-mentioned configuration, the inkjet application device may further comprise a fifth flow channel having a downstream end connected between the pump and the supply tank on the first flow channel. The fifth flow channel may have an upstream end communicating to a source tank, which is configured to store a larger amount of the liquid material than each of the supply tank and the feedback tank, and the source tank may accommodate a stirrer configured to stir the liquid material.

With this, the liquid material can be refilled from the source tank into the middle of the first flow channel through the fifth flow channel and pumped to the supply tank side with the pump. Further, the source tank accommodates the stirrer configured to stir the liquid material, and hence the state of dispersion of the particles in the liquid material can be made uniform.

In this case, the stirrer may comprise a blade member, which is arranged in the liquid material so as to be prevented from being brought into contact with the source tank, and is suspended and supported through a support bar, and the blade member may be configured to stir the liquid material with a magnetic force of a magnet. In this configuration, a magnet stirrer configured to rotate the blade member is set in a lower portion of the source tank so that the blade member is adjusted to an optimum rotation number, and thus the liquid material can be sufficiently stirred.

With this, the blade member performs a stirring action with a magnetic force of the magnet under a state of being held in no-contact with a peripheral wall and a bottom wall of the source tank. Therefore, the generation of foreign matters in association with the contact between the blade member and the source tank, and the mixing of the foreign matters into the liquid material are prevented, with the result that the cleanness of the liquid material having the particles dispersed therein can be maintained. In addition, when the liquid amount in the source tank is used up, and the tank is replaced, there is an advantage in that stirring can be immediately performed merely through replacement of the source tank.

In the above-mentioned configuration, the inkjet head may have a nozzle surface subjected to water-repellent treatment.

With this, the liquid material having the particles dispersed therein is prevented from being transferred to the nozzle surface through a nozzle hole of the inkjet head. Therefore, this configuration can appropriately maintain the shape of a meniscus of the nozzle in cooperation with the action of the above-mentioned negative pressure.

In the above-mentioned configuration, the particles may be particles contained in a raw material for a layer in one active material layer, which is formed on a negative electrode or positive electrode current collector, of a negative electrode active material layer and a positive electrode active material layer, a solid electrolyte layer formed on the one active material layer, or another active material layer, which is formed on the solid electrolyte layer, of the negative electrode active material layer and the positive electrode active material layer.

With this, the active material layer and the solid electrolyte layer forming a battery or an electrode sheet obtained in the course of manufacturing of the battery can be produced with satisfactory efficiency and high quality. The battery in this case may comprise a separator made of an inorganic material or the like, which is configured to prevent a short-circuit between a negative electrode and a positive electrode, in any one or both of a region between the negative electrode active material layer and the solid electrolyte layer and a region between the positive electrode active material layer and the solid electrolyte layer.

There can be provided a battery manufacturing apparatus, which is configured to produce, through use of the inkjet application device (hereinafter also referred to as "inkjet application device for layer formation") in this case, one active material layer, which is formed on a negative electrode or positive electrode current collector, of a negative electrode active material layer and a positive electrode active material layer, a solid electrolyte layer formed on the one active material layer, or another active material layer, which is formed on the solid electrolyte layer, of the negative electrode active material layer and the positive electrode active material layer.

With this, a battery manufacturing apparatus capable of producing the active material layer and the solid electrolyte layer forming a battery or an electrode sheet obtained in the course of manufacturing of the battery with satisfactory efficiency and high quality can be achieved.

Further, there can be provided a battery manufacturing apparatus, which is configured to apply the liquid material to a negative electrode or positive electrode current collector through use of the inkjet application device for layer formation and dry the liquid material, to thereby form a negative electrode active material layer or a positive electrode active material layer, while unwinding an elongated base material from a base material roll and conveying the elongated base material in a lateral direction, the base material roll having the elongated base material with flexibility wound in a roll shape, the elongated base material comprising an elongated film on which the negative electrode or positive electrode current collector is formed, and to wind an electrode sheet that is a laminate forming material into a roll shape, the laminate forming material having a laminate, which comprises the negative electrode or positive electrode current collector and the negative electrode active material layer or the positive electrode active material layer, formed on the elongated film. Conveying the elongated base material in the "lateral direction" is not limited to the case of conveying the elongated base material in a horizontal direction, but comprises the case of conveying the elongated base material so that the elongated base material is inclined downwardly or upwardly, for example, at an angle within 10° with respect to the horizontal direction (the same applies hereinafter).

In the battery manufacturing apparatus, the elongated base material forming the base material roll comprises the elongated film on which the negative electrode or positive electrode current collector is formed. While unwinding to winding are performed once through adoption of a roll-to-roll system, in the course of conveyance of the elongated base material in the lateral direction, the one active material layer is formed on the elongated base material by the inkjet application device for layer formation. With this, the laminate, which comprises the current collector and the one active material layer, is formed on the elongated film, to thereby obtain the electrode sheet.

Further, there can be provided a battery manufacturing apparatus, which is configured to apply the liquid material to an active material layer through use of the inkjet application device for layer formation and dry the liquid material, to thereby form a solid electrolyte layer, while unwinding an elongated base material from a base material roll and conveying the elongated base material in a lateral direction, the base material roll having the elongated base material with flexibility wound in a roll shape, the elongated base material comprising an elongated film on which a current collector is formed, a negative electrode active material layer or a positive electrode active material layer being formed on the current collector, and to wind a laminate forming material into a roll shape, the laminate forming material having a laminate, which comprises the current collector, the negative electrode active material layer or the positive electrode active material layer, and the solid electrolyte layer, formed on the elongated film.

In the battery manufacturing apparatus, the elongated base material forming the base material roll comprises the elongated film on which the negative electrode or positive electrode current collector is formed, the one active material layer being formed on the current collector by screen printing, gravure printing, the inkjet application device for layer formation, other inkjet application devices, or the like. While unwinding to winding are performed once through adoption of the roll-to-roll system, in the course of conveyance of the elongated base material in the lateral direction, the solid electrolyte layer is formed on the one active material layer by the inkjet application device for layer formation. With this, the laminate, which comprises the current collector, the one active material layer, and the solid electrolyte layer, is formed on the elongated film. The laminate in this case may comprise a separator made of an inorganic material or the like, which is configured to prevent a short-circuit between the negative electrode and the positive electrode, between the one active material layer and the solid electrolyte layer (the same also applies to the following laminate).

Further, there can be provided a battery manufacturing apparatus, which is configured to apply the liquid material to a solid electrolyte layer through use of the inkjet application device for layer formation and dry the liquid material, to thereby form another active material layer of a negative electrode active material layer and a positive electrode active material layer, while unwinding an elongated base material from a base material roll and conveying the elongated base material in a lateral direction, the base material roll having the elongated base material with flexibility wound in a roll shape, the elongated base material comprising an elongated film on which a negative electrode or positive electrode current collector is formed, one active material layer of the negative electrode active material layer and the positive electrode active material layer being formed on the negative electrode or positive electrode current collector, the solid electrolyte layer being formed on the one active material layer, and to wind a laminate forming material into a roll shape, the laminate forming material having a laminate, which comprises the negative electrode or positive electrode current collector, the one active material layer, the solid electrolyte layer, and the another active material layer, formed on the elongated film.

In the battery manufacturing apparatus, the elongated base material forming the base material roll comprises the elongated film on which the negative electrode or positive electrode current collector is formed, the one active material layer and the solid electrolyte layer being formed on the current collector by screen printing, gravure printing, the inkjet application device for layer formation, other inkjet application devices, or the like. While unwinding to winding are performed once through adoption of the roll-to-roll system, in the course of conveyance of the elongated base material in the lateral direction, the another active material layer is formed on the solid electrolyte layer by the inkjet application device for layer formation. With this, the laminate, which comprises the current collector, the one active material layer, the solid electrolyte layer, and the another active material layer is formed on the elongated film. The laminate in this case may comprise a separator made of an inorganic material or the like, which is configured to prevent a short-circuit between the negative electrode and the positive electrode, in any one or both of a region between the negative electrode active material layer and the solid electrolyte layer and a region between the positive electrode active material layer and the solid electrolyte layer (the same also applies to the following laminate).

Further, there can be provided a battery manufacturing apparatus, which is configured to form a negative electrode or positive electrode active material layer that is present on a negative electrode or positive electrode current collector and a solid electrolyte layer that is present on the negative electrode or positive electrode active material layer, while unwinding an elongated base material from a base material roll and conveying the elongated base material in a lateral direction, the base material roll having the elongated base material with flexibility wound in a roll shape, the elongated base material comprising an elongated film on which the negative electrode or positive electrode current collector is formed, and to wind a laminate forming material into a roll shape, the laminate forming material having a laminate, which comprises the negative electrode or positive electrode current collector, the negative electrode or positive electrode active material layer, and the solid electrolyte layer, formed on the elongated film, wherein at least one layer of the negative electrode or positive electrode active material layer and the solid electrolyte layer is formed by applying the liquid material through use of the inkjet application device for layer formation and drying the liquid material.

In the battery manufacturing apparatus, the laminate is formed on the elongated film according to the following two kinds of modes.

According to the first mode in this case, while unwinding to winding are performed once through adoption of the roll-to-roll system, the active material layer is formed on the negative electrode or positive electrode current collector by the inkjet application device for layer formation, and after that, the solid electrolyte layer is formed by screen printing, gravure printing, the inkjet application device for layer formation, other inkjet application devices, or the like. With this, the laminate, which comprises the current collector, the active material layer, and the solid electrolyte layer, is formed on the elongated film.

According to the second mode in this case, while unwinding to winding are performed once through adoption of the roll-to-roll system, the active material layer is formed on the negative electrode or positive electrode current collector by screen printing, gravure printing, the inkjet application device for layer formation, other inkjet application devices, or the like, and after that, the solid electrolyte layer is formed by the inkjet application device for layer formation. With this, the laminate, which comprises the current collector, the active material layer, and the solid electrolyte layer, is formed on the elongated film.

Further, there can be provided a battery manufacturing apparatus, which is configured to form one active material layer, which is present on a negative electrode or positive electrode current collector, of a negative electrode active material layer and a positive electrode active material layer, a solid electrolyte layer that is present on the one active material layer, and another active material layer, which is present on the solid electrolyte layer, of the negative electrode active material layer and the positive electrode active material layer, while unwinding an elongated base material from a base material roll and conveying the elongated base material in a lateral direction, the base material roll having the elongated base material with flexibility wound in a roll shape, the elongated base material comprising an elongated film on which the negative electrode or positive electrode current collector is formed, and to wind a laminate forming material into a roll shape, the laminate forming material having a laminate, which comprises the negative electrode or positive electrode current collector, the one active material layer, the solid electrolyte layer, and the another active material layer, formed on the elongated film, wherein at least one layer of the one active material layer, the solid electrolyte layer, and the another active material layer is formed by applying the liquid material through use of the inkjet application device for layer formation and drying the liquid material.

In the battery manufacturing apparatus, the laminate is formed on the elongated film according to the following three kinds of modes.

According to the first mode in this case, while unwinding to winding are performed once through adoption of the roll-to-roll system, the one active material layer is formed on the negative electrode or positive electrode current collector by the inkjet application device for layer formation, and after that, the solid electrolyte layer and the another active material layer are formed by screen printing, gravure printing, the inkjet application device for layer formation, other inkjet application devices, or the like. With this, the laminate, which comprises the current collector, the one active material layer, the solid electrolyte layer, and the another active material layer is formed on the elongated film.

According to the second mode in this case, while unwinding to winding are performed once through adoption of the roll-to-roll system, the one active material layer is formed on the negative electrode or positive electrode current collector by screen printing, gravure printing, the inkjet application device for layer formation, other inkjet application devices, or the like; then, the solid electrolyte layer is formed by the inkjet application device for layer formation; and after that, the another active material layer is formed by screen printing, gravure printing, the inkjet application device for layer formation, other inkjet application devices, or the like. With this, the laminate, which comprises the current collector, the one active material layer, the solid electrolyte layer, and the another active material layer, is formed on the elongated film.

According to the third mode in this case, while unwinding to winding are performed once through adoption of the roll-to-roll system, the one active material layer and the solid electrolyte layer are formed on the negative electrode or positive electrode current collector by screen printing, gravure printing, the inkjet application device for layer formation, other inkjet application devices, or the like, and after that, the another active material layer is formed by the inkjet application device for layer formation. With this, the laminate, which comprises the current collector, the one active material layer, the solid electrolyte layer, and the another active material layer, is formed on the elongated film.

Further, there can be provided a battery manufacturing apparatus, which is configured to form a solid electrolyte layer that is present on a negative electrode active material layer or a positive electrode active material layer, and another active material layer, which is present on the solid electrolyte layer, of the negative electrode active material layer and the positive electrode active material layer, while unwinding an elongated base material from a base material roll and conveying the elongated base material in a lateral direction, the base material roll having the elongated base material with flexibility wound in a roll shape, the elongated base material comprising an elongated film on which a negative electrode or positive electrode current collector is formed and on which the negative electrode active material layer or the positive electrode active material layer is formed on the negative electrode or positive electrode current collector, and to wind a laminate forming material into a roll shape, the laminate forming material having a laminate, which comprises the negative electrode or positive electrode current collector, the one active material layer, the solid electrolyte layer, and the another active material layer, formed on the elongated film, wherein at least one layer of the solid electrolyte layer and the another active material layer is formed by applying the liquid material through use of the inkjet application device for layer formation and drying the liquid material.

In the battery manufacturing apparatus, the laminate is formed on the elongated film according to the following two kinds of modes.

According to the first mode in this case, the elongated base material forming the base material roll is the electrode sheet in which the one active material layer is formed on the negative electrode or positive electrode current collector on the elongated film by screen printing, gravure printing, the inkjet application device for layer formation, other inkjet application devices, or the like. While unwinding to winding are performed once through adoption of the roll-to-roll system, in the course of conveyance of the electrode sheet that is the elongated base material in the lateral direction, the solid electrolyte layer is formed on the one active material layer by the inkjet application device for layer formation, and after that, the another active material layer is formed by screen printing, gravure printing, the inkjet application device for layer formation, other inkjet application devices, or the like. With this, the laminate, which comprises the current collector, the one active material layer, the solid electrolyte layer, and the another active material layer, is formed on the elongated film.

According to the second mode in this case, the elongated base material forming the base material roll is the electrode sheet in which the one active material layer is formed on the negative electrode or positive electrode current collector on the elongated film by screen printing, gravure printing, the inkjet application device for layer formation, other inkjet application devices, or the like. While unwinding to winding are performed once through adoption of the roll-to-roll system, in the course of conveyance of the electrode sheet that is the elongated base material in the lateral direction, the solid electrolyte layer is formed on the one active material layer by screen printing, gravure printing, the inkjet application device for layer formation, other inkjet application devices, or the like, and after that, the another active material layer is formed by the inkjet application device for layer formation. With this, the laminate, which comprises the current collector, the one active material layer, the solid electrolyte layer, and the another active material layer, is formed on the elongated film.

Advantageous Effects of Invention

As described above, according to the present invention, the liquid material having the particles dispersed therein can be appropriately applied through use of the inkjet head by preventing the liquid material supplied to the supply tank of the inkjet application device from flowing into the inkjet head under a state in which the air bubbles and the particles are mixed.

DESCRIPTION OF EMBODIMENTS

Referring to the accompanying drawings, an inkjet application device and a battery manufacturing apparatus according to embodiments of the present invention are described below.

First Embodiment

Figure 1:
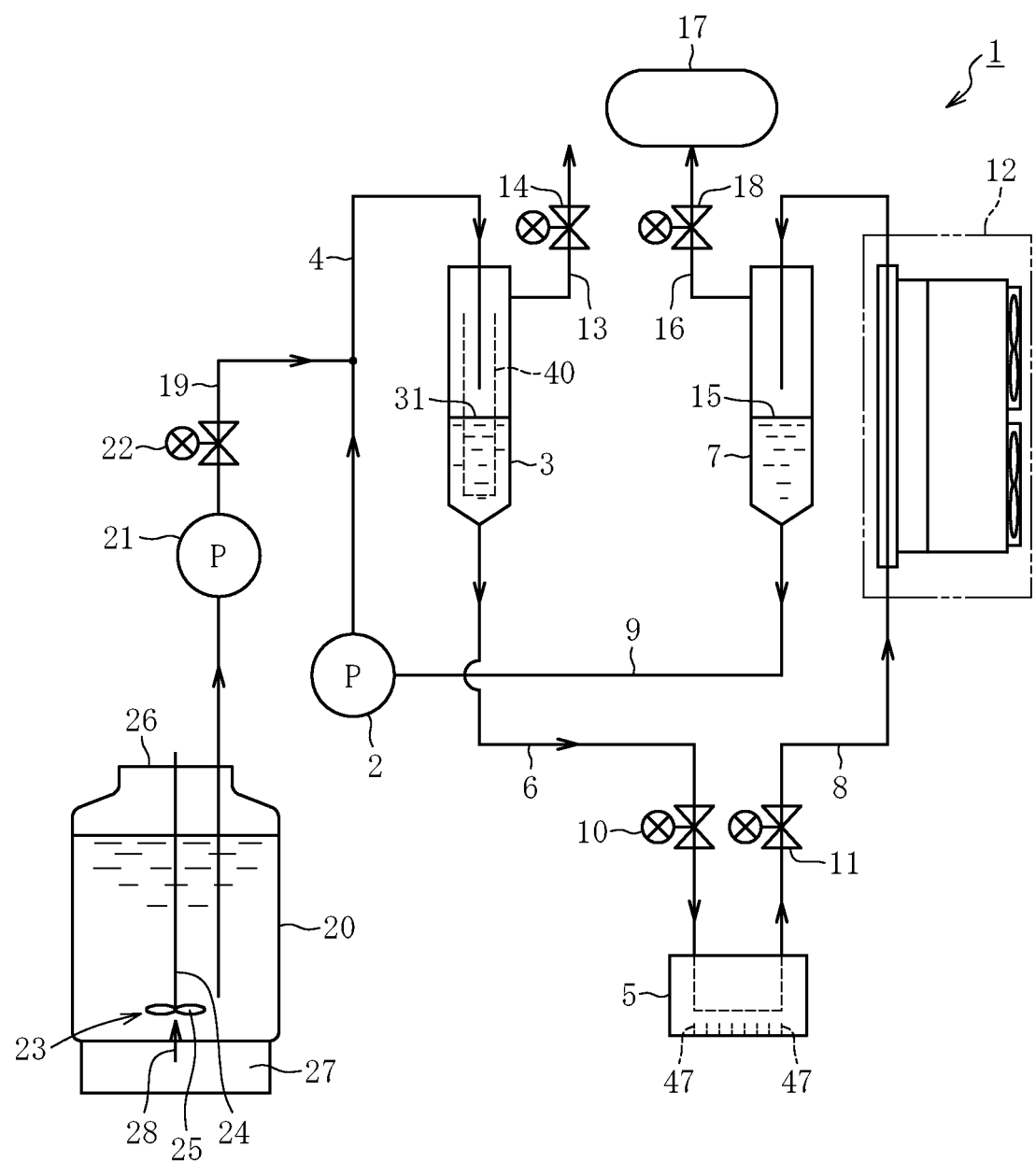
FIG. 1 is a schematic front view for illustrating an overall configuration of an inkjet application device according to a first embodiment of the present invention.

FIG. 1 is a schematic front view for illustrating an overall configuration of an inkjet application device (hereinafter simply referred to as "application device") according to a first embodiment of the present invention. As illustrated in FIG. 1, an application device 1 comprises a first flow channel 4, a second flow channel 6, a third flow channel 8, and a fourth flow channel 9. The first flow channel 4 is configured to supply a liquid material pumped with a pump 2 to a supply tank 3. The second flow channel 6 is configured to supply the liquid material in the supply tank 3 to an inkjet head 5. The third flow channel 8 is configured to feed back the liquid material supplied to the inkjet head 5 to a feedback tank 7. The fourth flow channel 9 is configured to supply the liquid material from the feedback tank 7 to the pump 2.

Thus, a distribution flow path for the liquid material in the application device 1 forms a circulation path that passes through the inkjet head 5.

On the second flow channel 6, there is installed a supply valve 10 configured to switch between supply and stop of the liquid material from the supply tank 3 to the inkjet head 5. On the third flow channel 8, there is installed a feedback valve 11 configured to switch between feedback and stop of the liquid material from the inkjet head 5 to the feedback tank 7. The supply valve 10 and the feedback valve 11 are configured to be closed mainly at a time of replacement of the inkjet head 5 to serve to prevent dripping of the liquid material from a pipe. Further, on the third flow channel 8, there is installed a Peltier unit 12 configured to perform temperature adjustment (mainly cooling) of the liquid material flowing from the inkjet head 5 to the feedback tank 7.

A space above a liquid surface 31 of the liquid material in the supply tank 3 communicates to the atmosphere through an atmosphere release flow channel 13. On the atmosphere release flow channel 13, there is installed an atmosphere switching valve 14 configured to switch between communication and disconnection with respect to the atmosphere. In addition, a space above a liquid surface 15 of the liquid material in the feedback tank 7 communicates to a negative pressure generator 17 through a negative pressure flow channel 16. On the negative pressure flow channel 16, there is installed a negative pressure switching valve 18 configured to switch between flow-through and interruption of a negative pressure.

Further, the application device 1 comprises a fifth flow channel 19, which has a downstream end connected between the pump 2 and the supply tank 3 on the first flow channel 4 and an upstream end communicating to a source tank 20. On the fifth flow channel 19, there are installed an auxiliary pump 21 and an auxiliary switching valve 22. The auxiliary pump 21 is configured to pump and refill the liquid material in the source tank 20 into the supply tank 3 from the middle of the first flow channel 4. The auxiliary switching valve 22 is configured to switch between refill and stop of the liquid material from the auxiliary pump 21. The source tank 20 is configured to store a larger amount of the liquid material than each of the supply tank 3 and the feedback tank 7.

The source tank 20 accommodates a stirrer 23 configured to stir the stored liquid material. The stirrer 23 comprises a blade member 25, which is arranged in the liquid material so as to be prevented from being brought into contact with the source tank 20, and is suspended and supported through a support bar 24. The support bar 24 is rotatably supported by a lid member 26 (or a fixing member above the lid member 26) covering an upper portion of the source tank 20 through a bearing. In addition, it is preferred that the blade member 25 be mounted at a position above a bottom surface of the source tank 20 by a distance from about 3 mm to about 8 mm so as to sufficiently stir the liquid material even when an amount of the liquid in the source tank 20 is reduced. The blade member 25 is configured to rotate at an appropriate rotation number with a magnetic force 28 of a magnet 27 arranged at an outer lower portion of the source tank 20, to thereby stir the liquid material stored in the source tank 20.

Figure 2:
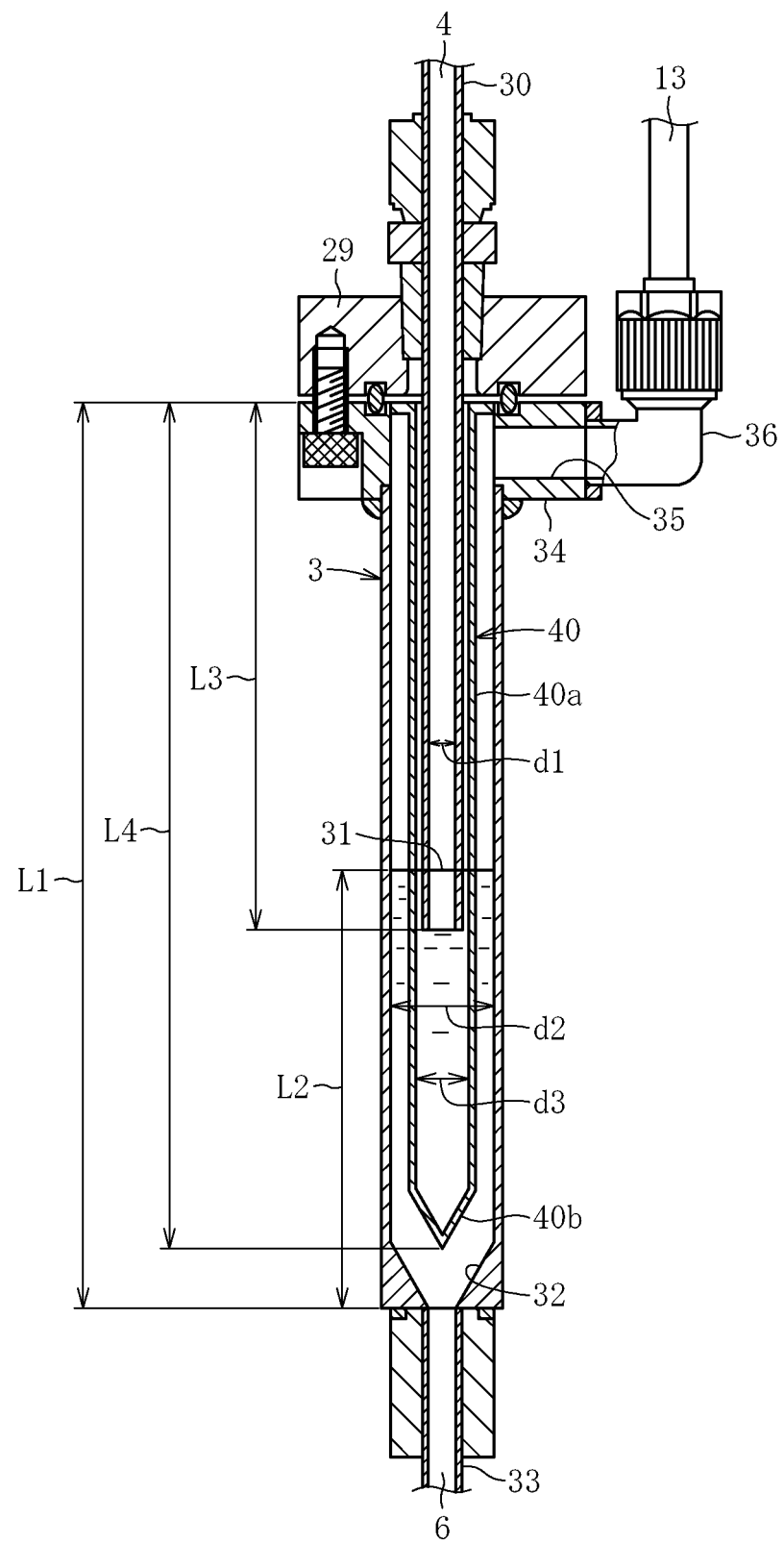
FIG. 2 is an enlarged vertical sectional front view for illustrating a detailed structure of a supply tank that is a component of the inkjet application device according to the first embodiment of the present invention.

FIG. 2 is a vertical sectional front view for illustrating a configuration of the supply tank 3 in detail. As illustrated in FIG. 2, in the supply tank 3, an internal space has a columnar shape, and an upper portion is covered with a lid member 29 in a sealed state. Further, a downstream side portion of a first pipe 30 forming the first flow channel 4 leads to an inside of the supply tank 3 through the lid member 29. As illustrated in FIG. 2, it is preferred that a lower end of the first pipe 30 be positioned slightly below the liquid surface 31 of the liquid material in the supply tank 3. The reason for this is that the liquid material released from the lower end of the first pipe 30 is prevented from being mixed with air in the internal space of the supply tank 3 to inevitably generate bubbles. In addition, the internal space of the supply tank 3 is gradually thinned downwardly so that a lower end portion thereof has a conical shape, and a second pipe 33 forming the second flow channel 6 is connected to a lower end of a thinned portion 32. The supply tank 3 comprises a flange portion 34 at an upper end, and the lid member 29 is sealed and fixed to the flange portion 34. In addition, the flange portion 34 has a flow-through hole 35 communicating to the internal space of the supply tank 3, and an atmosphere release pipe 36 forming the atmosphere release flow channel 13 is connected to the flow-through hole 35.

A relationship between the supply tank 3 and the first pipe 30 is set so that, when an inner diameter of the first pipe 30 is represented by d1, and an inner diameter of the supply tank 3 is represented by d2, d2/d1 is from 2 to 6. In the supply tank 3, a vertical length L1 of the internal space is larger than the inner diameter d2. Specifically, when the inner diameter of the supply tank is represented by d2, and the vertical length of the internal space of the supply tank 3 is represented by L1, L1/d2 is set to fall within a range of from 4 to 12. Further, when the inner diameter of the supply tank 3 is represented by d2, and a height of the liquid surface 31 of the liquid material in the supply tank 3 is represented by L2, L2/d2 is set to fall within a range of from 1.5 to 9.

In addition, a mesh filter 40 having a bottomed cylindrical shape is accommodated in the internal space of the supply tank 3. The mesh filter 40 has an upper end that is fixed to the upper end of the supply tank 3 and a lower end that is positioned slightly above a lower end of the supply tank 3 so as to be prevented from being brought into contact with the supply tank 3. The mesh filter 40 is arranged concentrically with the supply tank 3. When an inner diameter of the mesh filter 40 is represented by d3, and the inner diameter of the supply tank 3 is represented by d2, d2/d3 is set to fall within a range of from 1.5 to 3. A cylindrical body portion 40a of the mesh filter 40 is configured to completely cover an outer peripheral portion of the first pipe 30 that is present in the supply tank 3, and a bottom portion 40b thereof forms a conical shape. Further, the mesh filter 40 is made of stainless steel (SUS), having a mesh number of from 300 to 800 and a wire diameter of from 0.03 mm to 0.09 mm.

More specifically, the inner diameter d1 of the first pipe 30 is from 3 mm to 6 mm. A length L3 of the first pipe 30 in the supply tank 3 is from 50 mm to 100 mm. The inner diameter d2 of the supply tank 3 is from 10 mm to 30 mm. The vertical length L1 of the internal space of the supply tank 3 is from 100 mm to 200 mm. The inner diameter d3 of the mesh filter 40 is from 7 mm to 15 mm. A vertical length L4 of the mesh filter 40 is from 90 mm to 190 mm.

Figure 3:
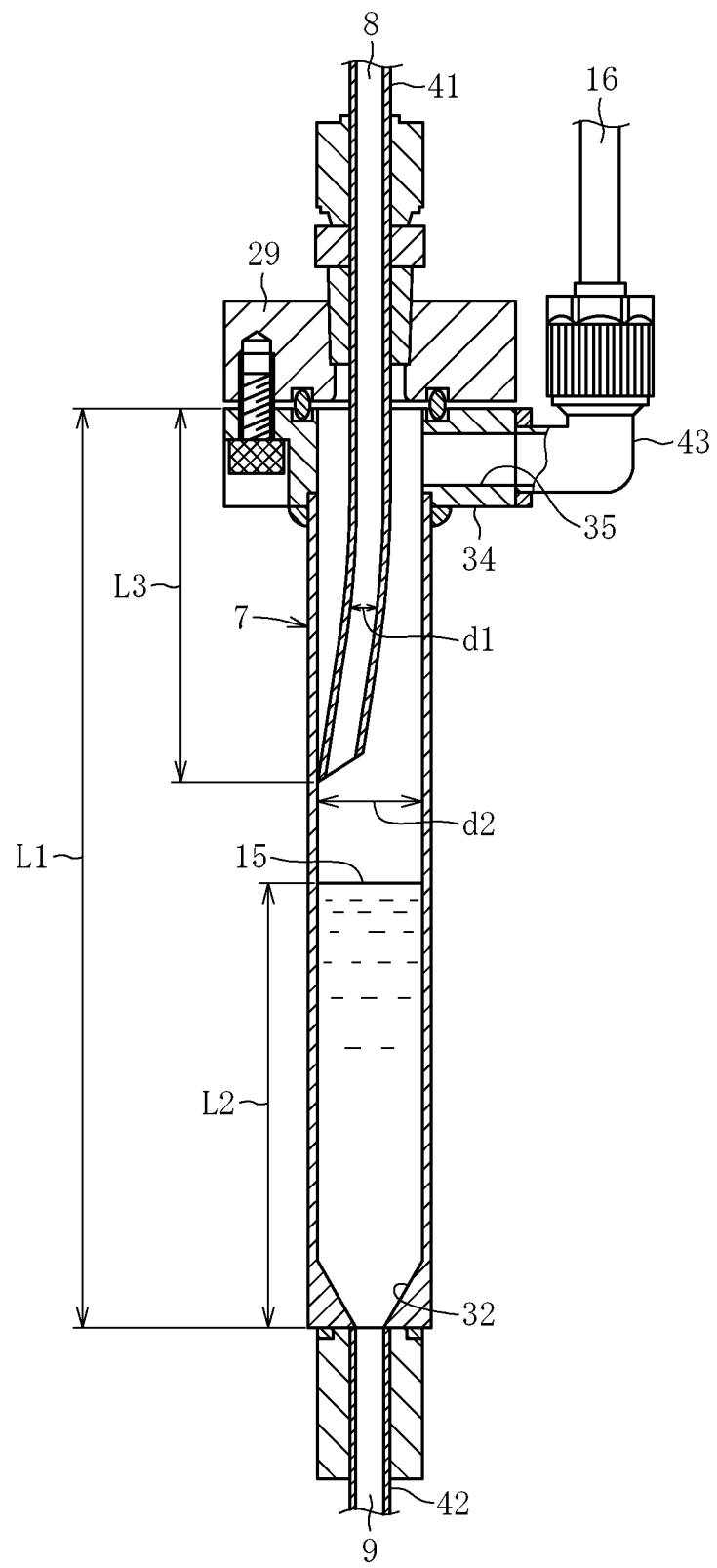
FIG. 3 is an enlarged vertical sectional front view for illustrating a detailed structure of a feedback tank that is a component of the inkjet application device according to the first embodiment of the present invention.

FIG. 3 is a vertical sectional front view for illustrating a configuration of the feedback tank 7 in detail. The feedback tank 7 is different from the supply tank 3 in the following points. The mesh filter 40 is not provided. The feedback tank 7 comprises a third pipe 41 forming the third flow channel 8 above the feedback tank 7, a fourth pipe 42 forming the fourth flow channel 9 below the feedback tank 7, and a negative pressure pipe 43 forming the negative pressure flow channel 16 at an upper side end. The third pipe 41 is bent so that a lower end thereof is brought into contact with an inner peripheral surface of the feedback tank 7. Other configurations are the same as those of the supply tank 3. Therefore, configuration requirements (including reference symbols of various dimensions and numerical values thereof) common to both the supply tank 3 and the feedback tank 7 are denoted by the same reference symbols, and description thereof is omitted.

Figure 4:
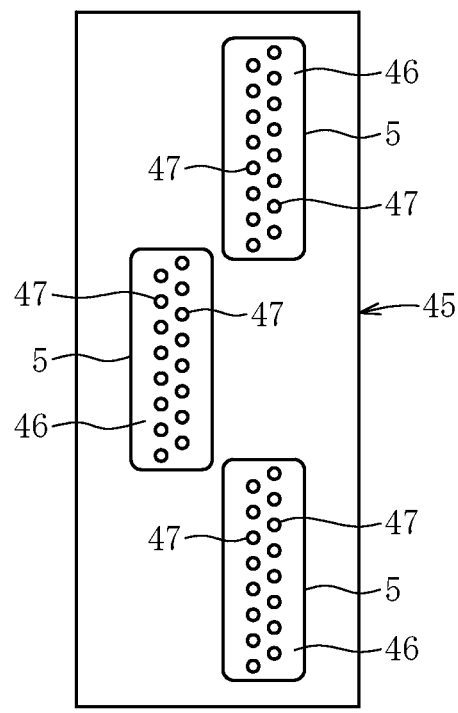
FIG. 4 is a bottom view for illustrating a first example of an inkjet head that is a component of the inkjet application device according to the first embodiment of the present invention.

FIG. 4 is a schematic bottom view of an inkjet head unit 45, which comprises the inkjet heads 5 used in this embodiment in a lower end portion, when viewed from below. The unit 45 comprises a plurality of (three in the illustrated example) inkjet heads 5 arrayed in a staggered pattern, and a plurality of nozzle holes 47 are formed in a staggered pattern in two rows in the illustrated example on a nozzle surface (lower surface) 46 of each of the inkjet heads 5. In this case, the second flow channel 6 and the third flow channel 8 communicate to the plurality of inkjet heads 5 through an inside of the inkjet head unit 45. The nozzle surface 46 of each of the plurality of inkjet heads 5 is subjected to water-repellent treatment.

Figure 5:
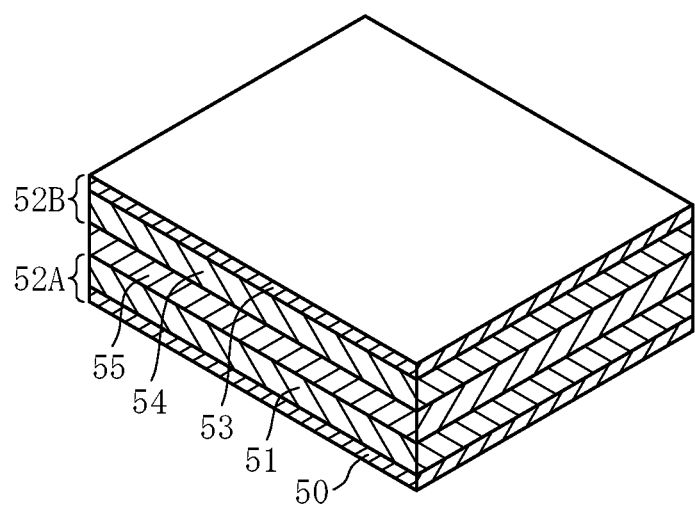
FIG. 5 is a perspective view for illustrating a first example of a battery manufactured through use of the inkjet application device according to the first embodiment of the present invention.

FIG. 5 is a schematic perspective view for illustrating a basic configuration of a battery (all-solid-state lithium battery) manufactured by a battery manufacturing apparatus (described later) using the application device 1 having the above-mentioned configuration. As illustrated in FIG. 5, in the battery, a negative electrode current collector 50 and a negative electrode active material layer 51 joined to the negative electrode current collector 50 form a negative electrode 52A, and a positive electrode current collector 53 and a positive electrode active material layer 54 joined to the positive electrode current collector 53 form a positive electrode 52B. A solid electrolyte layer 55 is interposed between the negative electrode active material layer 51 and the positive electrode active material layer 54. A separator made of an inorganic material, which is configured to prevent a short-circuit between the positive electrode and the negative electrode, may be interposed in any one or both of a region between the negative electrode active material layer 51 and the solid electrolyte layer 55 and a region between the positive electrode active material layer 54 and the solid electrolyte layer 55.

In this case, as the negative electrode current collector 50 and the positive electrode current collector 53, a metal foil (for example, a copper foil, an aluminum foil, or a SUS foil) can be used.

In addition, a forming material (liquid material) for each of the negative electrode active material layer 51 and the positive electrode active material layer 54 has particles dispersed therein, and is described below in detail. That is, negative electrode and positive electrode active material particles dispersed in solvents (dispersion media) can be used as the forming materials for both the negative electrode active material layer 51 and the positive electrode active material layer 54, respectively. Specifically, those forming materials are liquid materials adjusted for ink physical properties so as to have a viscosity at 25° C. of from 6 mPa·s to 20 mPa·s and a surface tension at 25° C. within a range of from 25 mN·m to 45 mN·m in order to be stably discharged through an inkjet system. In addition, as the active material particles to be contained, those having a maximum particle diameter of 5 μm or less were adopted. There is no particular limitation on those forming materials as long as the forming materials are ink having particles dispersed therein, which can be discharged through the inkjet system. For example, as negative electrode active material particles, a carbon-based material such as natural graphite or artificial graphite can be used. In addition, as positive electrode active material particles, a Li—Mn based oxide, a Li—Ni based oxide, a Li—Co based oxide, or the like can be used. It is desired that a particle dispersion liquid be ink that is not completely sedimented or re-aggregated within 20 minutes when being allowed to stand still. When sedimentation and aggregation cannot be suppressed only with particles and a solvent, a stable dispersion liquid can be prepared through use of a dispersant together. Further, it is desired that an additive for improving adhesiveness, such as a binder, be added to those forming materials. In addition, it is desired that a conductive aid such as carbon black be added to those forming materials in order to improve ion conductivity in the negative electrode active material layer 51 and the positive electrode active material layer 54.

Further, a forming material (liquid material) for the solid electrolyte layer 55 also has particles dispersed therein, and is described below in detail. Specifically, inorganic solid electrolyte particles dispersed in a solvent (dispersion medium) can be used. Specifically, those forming materials are liquid materials adjusted for ink physical properties so as to have a viscosity at 25° C. of from 6 mPa·s to 20 mPa·s and a surface tension at 25° C. within a range of from 25 mN·m to 45 mN·m in order to be stably discharged through the inkjet system. In addition, as inorganic solid electrolyte particles to be contained, those having a maximum particle diameter of 5 μm or less can be used. There is no particular limitation on those forming materials as long as the forming materials are ink having particles dispersed therein, which can be discharged through the inkjet system. For example, particles of a sulfide-based electrolyte system such as LGPS, particles of an oxide-based electrolyte system such as LiPON, or the like can be used. It is desired that a particle dispersion liquid be ink that is not completely sedimented or re-aggregated within 20 minutes when being allowed to stand still. When sedimentation and aggregation cannot be suppressed only with particles and a solvent, a stable dispersion liquid can be prepared through use of a dispersant together. Further, it is desired that an additive for improving adhesiveness, such as a binder, be added to those forming materials.

In the first embodiment, the liquid material having particles dispersed therein as described above is prepared so as to be applied by the application device 1. The particles have a maximum particle diameter of from 1 μm to 10 μm, a lower limit value thereof being more preferably 3 μm, an upper limit value thereof being more preferably 7 μm.

Next, the action and effect of the application device 1 according to the first embodiment having the above-mentioned configuration are described.

In the distribution flow path of a circulation type illustrated in FIG. 1, the liquid material pumped with the pump 2 is supplied to the supply tank 3 through the first flow channel 4. In this case, the supply valve 10 and the feedback valve 11 are opened, and hence the liquid material is in a state of flowing through the inkjet head 5. In addition, the atmosphere switching valve 14 is opened, and hence an atmosphere release state is achieved with respect to the supply tank 3. However, the pump 2 is driven all the time, and hence a negative pressure is being applied to the feedback tank 7 when the negative pressure switching valve 18 is opened. Further, the auxiliary switching valve 22 is closed, and the auxiliarypump 21 is in a non-driven state. With this, refilling of the liquid material from the source tank 20 to the first flow channel 4 is stopped.

In this state, the following operation is performed. The liquid material pumped with the pump 2 is returned to the pump 2 through the first flow channel 4, the supply tank 3, the second flow channel 6, the inkjet head 5, the third flow channel 8, the feedback tank 7, and the fourth flow channel 9. When such operation is performed, air bubbles generated by pumping of the pump 2 is mixed in the liquid material supplied to the supply tank 3 through the first flow channel 4. Further, the liquid material has the above-mentioned particles dispersed therein. Thus, the air bubbles and the particles are mixed in the liquid material supplied to the supply tank 3.

The liquid material having the air bubbles and the particles mixed therein flows into a region below the liquid surface 31 of the liquid material in the supply tank 3 through the first pipe 30 illustrated in FIG. 2. In this case, the internal space of the supply tank 3 accommodates the mesh filter 40 that has a bottomed cylindrical shape having a mesh number of from 300 to 800 and a wire diameter of from 0.03 mm to 0.09 mm and comprising a bottom portion. In this case, the mesh filter 40 is configured to cover the first pipe 30 in the supply tank 3 in a bag shape over a full length. Therefore, the entire amount of the liquid material supplied through the first pipe 30 flows into an inside of the mesh filter 40. Then, the mesh filter 40 traps substantially all the air bubbles in the liquid material and allows substantially all the particles to pass therethrough. As a result, the liquid material having the particles present therein and substantially no air bubble present therein flows out to an outer peripheral space of the mesh filter 40 in the supply tank 3. The function of the mesh filter 40 to appropriately trap the air bubbles and appropriately allow the particles to pass therethrough is described in detail in [Example 1] described later.

Further, the liquid material supplied into the supply tank 3 can have the following advantages. Specifically, the ratio d2/d1 that indicates the relationship between the inner diameter d1 of the first pipe 30 and the inner diameter d2 of the supply tank 3 is from 2 to 6, and the vertical length L1 of the internal space of the supply tank 3 is larger than the inner diameter d2 of the supply tank 3. With this, the supply tank 3 has a thin and long shape elongated in the vertical direction, and the supply tank 3 becomes thin with respect to the first pipe 30 as compared to the related art. Therefore, the flow-through speed of the liquid material having the particles dispersed therein in the supply tank 3 is increased, and the flow thereof is less liable to stagnate. In order to obtain such advantage, it is more preferred that the ratio d2/d1 be from 3.5 to 4.5. In addition, the ratio L1/d2 that indicates the relationship between the inner diameter d2 of the supply tank 3 and the vertical length L1 of the internal space of the supply tank 3 is from 4 to 12. With this, an increase in flow-through speed of the liquid material and prevention of stagnation thereof, which are brought about by forming the supply tank 3 into the thin and long shape elongated in the vertical direction, are further improved. In order to obtain such advantage, it is preferred that the ratio L1/d2 be from 5 to 10. Further, the ratio L2/d2 that indicates the relationship between the inner diameter d2 of the supply tank 3 and the height L2 of the liquid surface 31 of the liquid material in the supply tank 3 is from 1.5 to 9. With this, the flow rate of the liquid material having the particles dispersed therein becomes appropriate, and stagnation and the like are less liable to occur. In order to obtain such advantage, it is more preferred that the ratio L2/d2 be from 3 to 5. The ratio d2/d3 that indicates the relationship between the inner diameter d3 of the mesh filter 40 and the inner diameter d2 of the supply tank 3 is from 1.5 to 3. With this, the function of the mesh filter 40 to trap the air bubbles and the function of the mesh filter 40 to allow the particles to pass therethrough are sufficiently obtained. In order to obtain such advantage, it is more preferred that the ratio d2/d3 be from 1.8 to 2.5.

Figure 6:
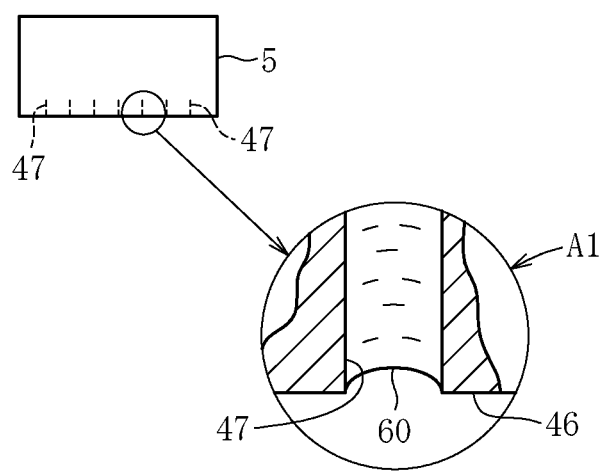
FIG. 6 is a schematic front view for illustrating a first example of a structure in a periphery of a nozzle of the inkjet head that is a component of the inkjet application device according to the first embodiment of the present invention.

In addition, when the application device 1 has the configuration illustrated in FIG. 1, the following advantages can also be obtained. Specifically, the application device 1 adopts a circulation system in which the liquid material is circulated, and hence the liquid material is circulated even when the liquid material is not discharged from the inkjet head 5, with the result that the liquid material flows all the time. Therefore, sedimentation and aggregation of the particles, which may occur when the flow of the liquid material is stopped, can be prevented. Further, as described above, the maximum particle diameter of the particles in the liquid material is from 1 μm to 10 μm, the lower limit value thereof being preferably 3 μm, the upper limit value thereof being preferably 7 μm. Meanwhile, the diameter of each of the nozzle holes 47 of the inkjet head 5 is from 20 μm to 60 μm. Therefore, when the particles are sedimented and aggregated, it becomes difficult to discharge the liquid material from the nozzle holes 47 under a state in which the particles are uniformly dispersed, and discharge abnormality occurs. However, in the inkjet application device 1, sedimentation and aggregation of the particles can be prevented, and hence discharge abnormality is less liable to occur. In addition, on the third flow channel 8 through which the liquid material is fed back from the inkjet head 5, the Peltier unit 12 is arranged. Therefore, when the temperature of the liquid material is increased in the inkjet head 5, the liquid material is cooled by the Peltier unit 12, and the liquid material can be maintained at an appropriate temperature all the time. Further, a negative pressure is applied to the inside of the feedback tank 7, and hence an appropriate meniscus 60 is generated in each of the nozzle holes 47 as denoted by reference symbol A1 of FIG. 6. Further, the nozzle surface 46 of the inkjet head 5 is subjected to water-repellent treatment, and hence the generation of the appropriate meniscus 60 is not inhibited.

The application device 1 having the above-mentioned configuration and action and effect is used in a battery manufacturing apparatus described below.

Figure 7:
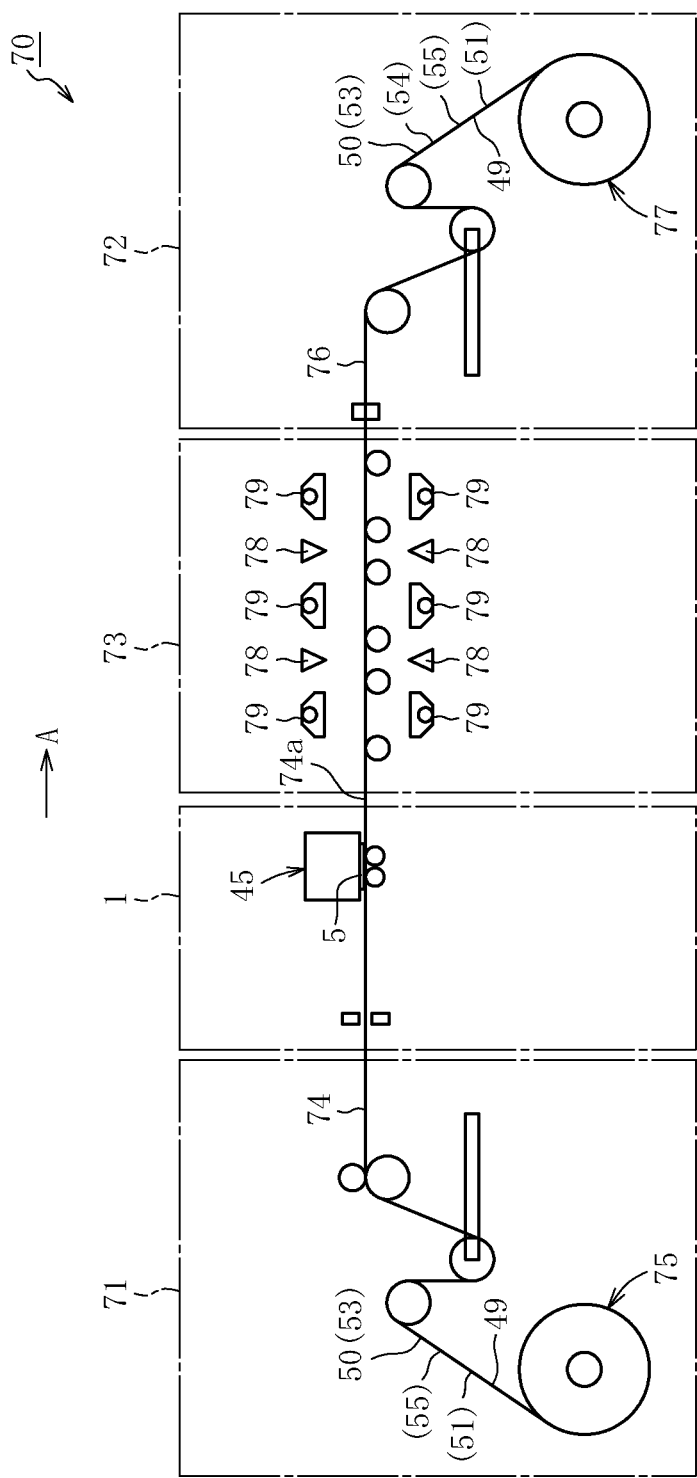
FIG. 7 is a schematic side view for illustrating a first example of a battery manufacturing apparatus constructed through use of the inkjet application device according to the first embodiment of the present invention.

FIG. 7 is a schematic side view for illustrating such battery manufacturing apparatus. As illustrated in FIG. 7, a battery manufacturing apparatus 70 adopts a roll-to-roll system, and comprises, as main components, an unwinding device 71 and a winding device 72 in roll-to-roll, the application device 1, and a thermal drying device 73.

In the battery manufacturing apparatus 70, an elongated base material 74 serving as an object to be coated comprises: an elongated film 49 made of a resin or the like having the negative electrode current collector 50 or the positive electrode current collector 53 formed thereon (on an outer peripheral side); the elongated film 49 having the negative electrode current collector 50 or the positive electrode current collector 53 formed thereon, on which the negative electrode active material layer 51 is formed; or the elongated film 49 having the negative electrode current collector 50 or the positive electrode current collector 53 formed thereon, on which the negative electrode active material layer 51 and the solid electrolyte layer 55 are formed. While the elongated base material 74 is unwound from a base material roll 75 obtained by winding the elongated base material 74 into a roll shape and conveying the elongated base material 74 in a lateral direction, any one layer of the negative electrode active material layer 51, the solid electrolyte layer 55, and the positive electrode active material layer 54 is formed on the elongated base material 74. Further, a laminate forming material 76 comprising a laminate, which comprises the above-mentioned one layer on the elongated film 49, is wound into a roll shape as a winding roll 7.

In this case, unwinding of the elongated base material 74 from the base material roll 75 is performed by the unwinding device 71, and winding of the laminate forming material 76 as the winding roll 77 is performed by the winding device 72. Further, the above-mentioned one layer is formed on the elongated base material 74 conveyed in the lateral direction by the application device 1 and the thermal drying device 73.

The thermal drying device 73 comprises a plurality of hot air outlets 78 and a plurality of lamp houses 79. Each of the plurality of lamp houses 79 is configured to accommodate a far-infrared lamp or a near-infrared lamp. The plurality of hot air outlets 78 and the plurality of lamp houses 79 are alternately arranged in a conveyance direction in each of upper side space and a lower side space of a coated portion 74a of the elongated base material 74 having the liquid material that is a forming material for the one layer applied thereto by the inkjet head 5. The thermal drying device 73 in this case may be formed of only any one of the hot air outlet 78 and the lamp house 79. In addition, the hot air outlets 78 or the lamp houses 79 may be arranged only in any one of the upper side space and the lower side space. Further, the lamp house 79 may not be formed of a lamp such as a far-infrared lamp, and may be a far-infrared light irradiation unit that adopts ceramic thermal spraying using a heater. An optimum condition is selected from the foregoing in consideration of the quality of a film to be formed through use of the liquid material, drying time, and the like.

In the battery manufacturing apparatus 70, when passing through the application device 1, the elongated base material 74 that is unwound from the base material roll 75 and conveyed in the lateral direction (direction indicated by the arrow A) is subjected to application of the liquid material (liquid material having the particles dispersed therein) that is the forming material for the one layer from a large number of nozzle holes 47 of the inkjet heads 5.

Figure 8:
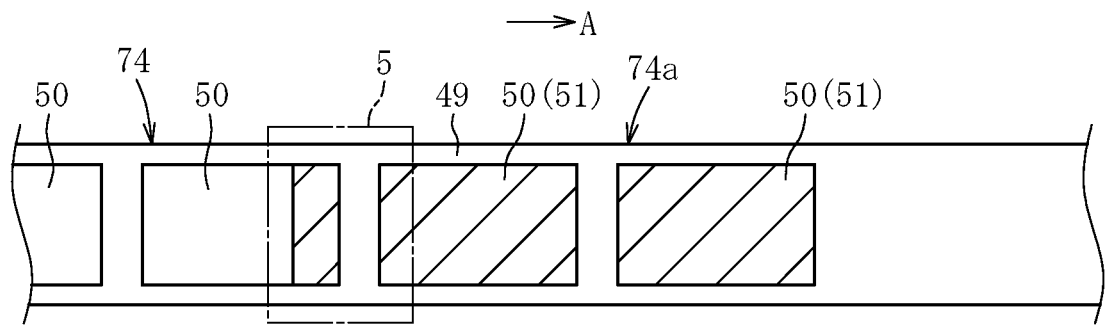
FIG. 8 is a schematic plan view for illustrating a process in which a battery is manufactured in the first example of the battery manufacturing apparatus constructed through use of the inkjet application device according to the first embodiment of the present invention.
Figure 9:
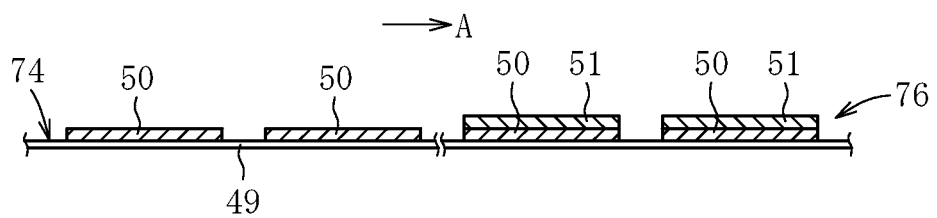
FIG. 9 is a schematic side view for illustrating the process in which the battery is manufactured in the first example of the battery manufacturing apparatus constructed through use of the inkjet application device according to the first embodiment of the present invention.

In this case, when the elongated base material 74 comprises the elongated film 49 on which the negative electrode current collectors 50 are formed intermittently in a longitudinal direction, the negative electrode active material layers 51 to be formed by the application device 1 and the thermal drying device 73 are also formed on the negative electrode current collectors 50 intermittently in the longitudinal direction, as illustrated in FIG. 8. Therefore, application regions of the liquid material applied to the negative electrode current collectors 50 by the inkjet heads 5 also become rectangular regions formed intermittently in the longitudinal direction, as indicated by the parallel hatched lines in FIG. 8. Then, the rectangular regions are sequentially dried by the thermal drying device 73, with the result that the negative electrode active material layers 51 are sequentially formed on the negative electrode current collectors 50, as illustrated in FIG. 9. Thus, in this case, the laminate forming material 76 is obtained, in which laminates each comprising the negative electrode current collector 50 and the negative electrode active material layer 51 are formed on the elongated film 49 intermittently in the longitudinal direction. The laminate forming material 76 is wound into a roll shape to obtain the winding roll 77.

Figure 10:
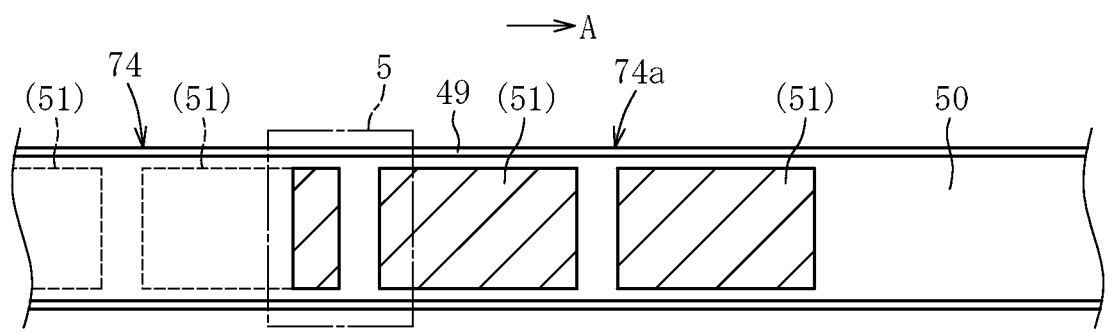
FIG. 10 is a schematic plan view for illustrating the process in which the battery is manufactured in the first example of the battery manufacturing apparatus constructed through use of the inkjet application device according to the first embodiment of the present invention.
Figure 11:
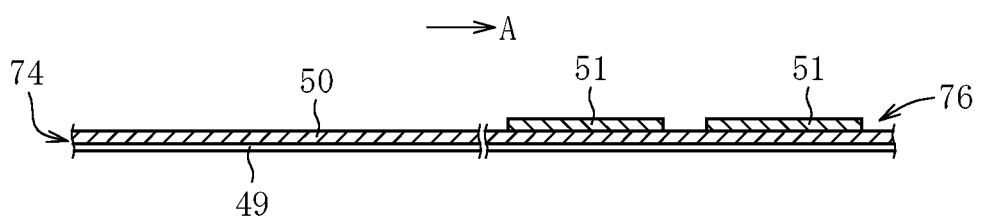
FIG. 11 is a schematic side view for illustrating the process in which the battery is manufactured in the first example of the battery manufacturing apparatus constructed through use of the inkjet application device according to the first embodiment of the present invention.

Further, when the elongated base material 74 comprises the elongated film 49 on which the negative electrode current collectors 50 are formed continuously in a longitudinal direction, it is preferred that the negative electrode active material layers 51 to be formed by the application device 1 and the thermal drying device 73 be formed on the negative electrode current collectors 50 intermittently in the longitudinal direction, as illustrated in FIG. 10. In this case, application regions of the liquid material applied to the negative electrode current collectors 50 by the inkjet heads 5 also become rectangular regions formed intermittently in the longitudinal direction, as indicated by the parallel hatched lines in FIG. 10. Then, the rectangular regions are sequentially dried by the thermal drying device 73, with the result that the negative electrode active material layers 51 are sequentially formed on the continuously formed negative electrode current collectors 50, as illustrated in FIG. 11. Thus, in this case, the laminate forming material 76 is obtained, in which laminates each comprising the continuous negative electrode current collector 50 and the intermittent negative electrode active material layer 51 are formed on the elongated film 49 in the longitudinal direction. The laminate forming material 76 is wound into a roll shape to obtain the winding roll 77.

Figure 12:
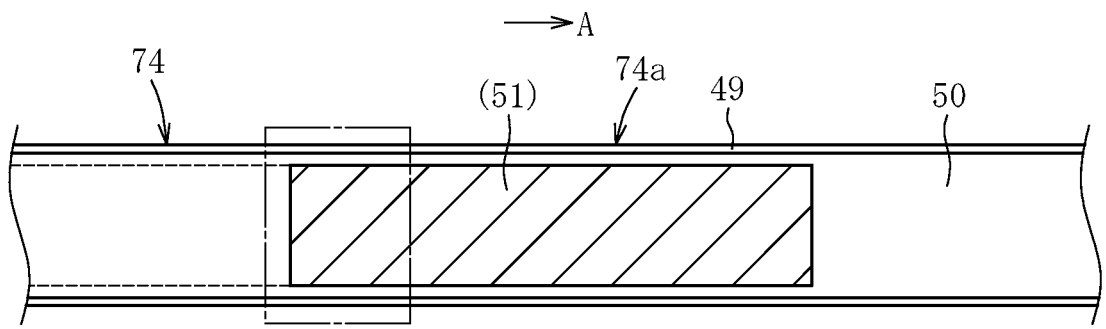
FIG. 12 is a schematic plan view for illustrating the process in which the battery is manufactured in the first example of the battery manufacturing apparatus constructed through use of the inkjet application device according to the first embodiment of the present invention.
Figure 13:
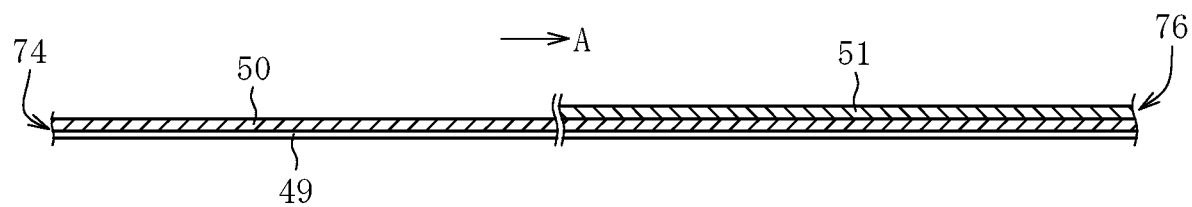
FIG. 13 is a schematic side view for illustrating the process in which the battery is manufactured in the first example of the battery manufacturing apparatus constructed through use of the inkjet application device according to the first embodiment of the present invention.

When the elongated base material 74 comprises the elongated film 49 on which the negative electrode current collector 50 is formed continuously in the longitudinal direction, the negative electrode active material layer 51 to be formed by the application device 1 and the thermal drying device 73 may be formed on the negative electrode current collector 50 continuously in the longitudinal direction, as illustrated in FIG. 12. In this case, the application region of the liquid material applied to the negative electrode current collector 50 by the inkjet head 5 also becomes a region continuous in the longitudinal direction, as indicated by the parallel hatched lines in FIG. 12. Then, this continuous region is dried by the thermal drying device 73, with the result that the negative electrode active material layer 51 is sequentially formed on the continuously formed negative electrode current collector 50, as illustrated in FIG. 13. Thus, in this case, an electrode sheet formed of the laminate forming material 76 is obtained, in which a laminate comprising the continuous negative electrode current collector 50 and the continuous negative electrode active material layer 51 is formed on the elongated film 49 in the longitudinal direction. The laminate forming material 76 is wound into a roll shape to obtain the winding roll 77.

Figure 14:
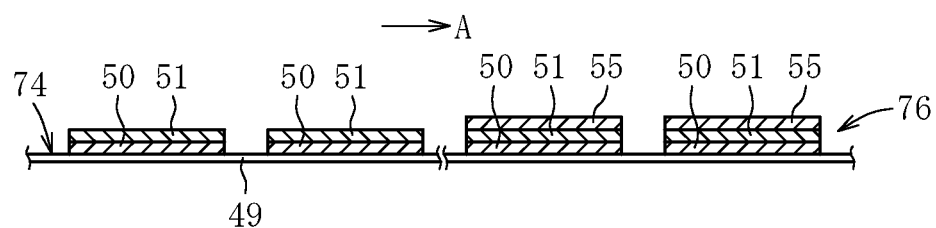
FIG. 14 is a schematic side view for illustrating the process in which the battery is manufactured in the first example of the battery manufacturing apparatus constructed through use of the inkjet application device according to the first embodiment of the present invention.
Figure 15:
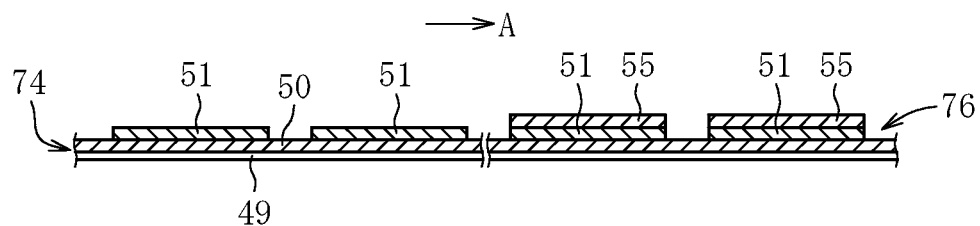
FIG. 15 is a schematic side view for illustrating the process in which the battery is manufactured in the first example of the battery manufacturing apparatus constructed through use of the inkjet application device according to the first embodiment of the present invention.
Figure 16:
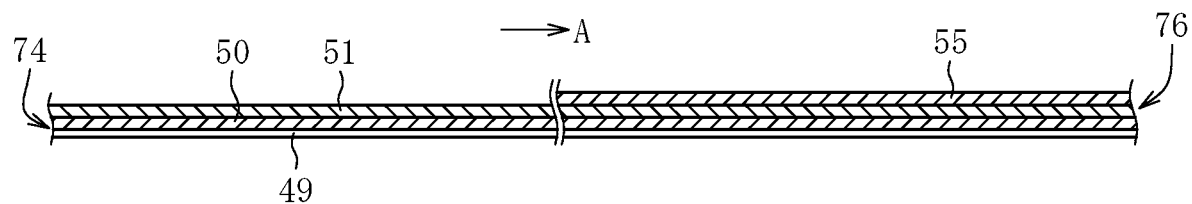
FIG. 16 is a schematic side view for illustrating the process in which the battery is manufactured in the first example of the battery manufacturing apparatus constructed through use of the inkjet application device according to the first embodiment of the present invention.
Figure 17:
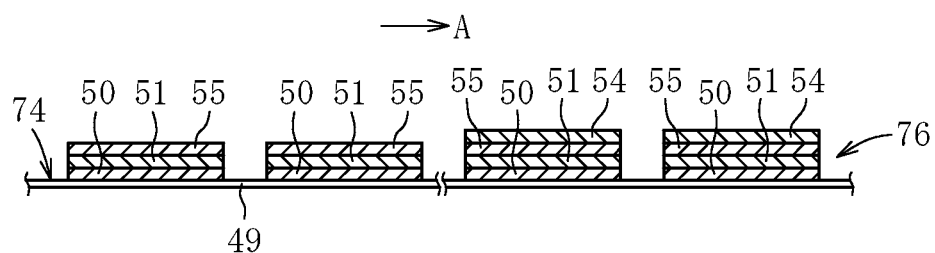
FIG. 17 is a schematic side view for illustrating the process in which the battery is manufactured in the first example of the battery manufacturing apparatus constructed through use of the inkjet application device according to the first embodiment of the present invention.
Figure 18:
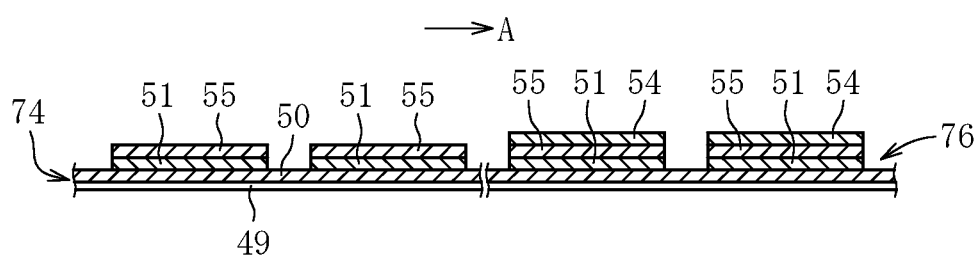
FIG. 18 is a schematic side view for illustrating the process in which the battery is manufactured in the first example of the battery manufacturing apparatus constructed through use of the inkjet application device according to the first embodiment of the present invention.
Figure 19:
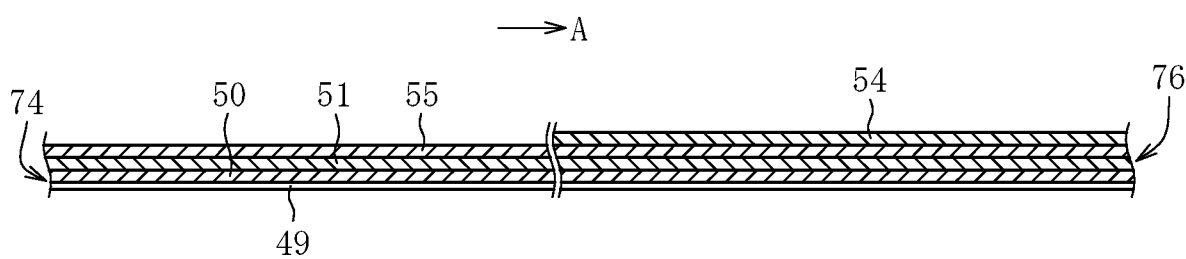
FIG. 19 is a schematic side view for illustrating the process in which the battery is manufactured in the first example of the battery manufacturing apparatus constructed through use of the inkjet application device according to the first embodiment of the present invention.

The elongated base material 74 comprises the elongated film 49 on which the negative electrode current collector 50 is formed. However, besides the foregoing, the elongated base material 74 as described below may be used. Specifically, FIG. 14 is a view for illustrating the elongated base material 74 comprising the elongated film 49 on which both the negative electrode current collectors 50 and the negative electrode active material layers 51 are formed intermittently in the longitudinal direction. Thus, in this case, as illustrated in FIG. 14, the laminate forming material 76 is obtained, in which the laminates each comprising the negative electrode current collector 50, the negative electrode active material layer 51, and the solid electrolyte layer 55 are formed on the elongated film 49 intermittently in the longitudinal direction. In addition, FIG. 15 is a view for illustrating the elongated base material 74 comprising the elongated film 49 on which the negative electrode current collector 50 is formed continuously in the longitudinal direction and the negative electrode active material layers 51 are formed intermittently in the longitudinal direction. Thus, in this case, as illustrated in FIG. 15, the laminate forming material 76 is obtained, in which a laminate comprising the continuous negative electrode current collector 50, the intermittent negative electrode active material layers 51, and the intermittent solid electrolyte layers 55 is formed on the elongated film 49 in the longitudinal direction. In addition, FIG. 16 is a view for illustrating the elongated base material 74 comprising the elongated film 49 on which the negative electrode current collector 50 is formed continuously in the longitudinal direction and the negative electrode active material layers 51 are formed continuously in the longitudinal direction. Thus, in this case, as illustrated in FIG. 16, the laminate forming material 76 is obtained, in which a laminate comprising the continuous negative electrode current collector 50, the continuous negative electrode active material layers 51, and the continuous solid electrolyte layers 55 is formed on the elongated film 49 in the longitudinal direction. In addition, FIG. 17 is a view for illustrating the elongated base material 74 comprising the elongated film 49 on which the negative electrode current collector 50, the negative electrode active material layers 51, and the continuous solid electrolyte layers 55 are formed intermittently in the longitudinal direction. Thus, in this case, as illustrated in FIG. 17, the laminate forming material 76 is obtained, in which a laminate comprising the negative electrode current collector 50, the negative electrode active material layers 51, and the solid electrolyte layers 55 is formed on the elongated film 49 intermittently in the longitudinal direction. In addition, FIG. 18 is a view for illustrating the elongated base material 74 comprising the elongated film 49 on which the negative electrode current collector 50 is formed continuously in the longitudinal direction, the negative electrode active material layers 51 are formed intermittently in the longitudinal direction, and the solid electrolyte layers 55 are formed intermittently in the longitudinal direction. Thus, in this case, as illustrated in FIG. 18, the laminate forming material 76 is obtained, in which a laminate comprising the continuous negative electrode current collector 50, the intermittent negative electrode active material layers 51, and the intermittent solid electrolyte layers 55 is formed on the elongated film 49 in the longitudinal direction. In addition, FIG. 19 is a view for illustrating the elongated base material 74 comprising the elongated film 49 on which the negative electrode current collector 50 is formed continuously in the longitudinal direction, the negative electrode active material layers 51 are formed continuously in the longitudinal direction, and the solid electrolyte layers 55 are formed continuously in the longitudinal direction. Thus, in this case, as illustrated in FIG. 19, the laminate forming material 76 is obtained, in which a laminate comprising the continuous negative electrode current collector 50, the continuous negative electrode active material layers 51, and the continuous solid electrolyte layers 55 is formed on the elongated film 49 in the longitudinal direction.

In this case, it is preferred that the thickness of each of the negative electrode current collector 50 and the positive electrode current collector 53 be from 5 μm to 20 μm. In addition, it is preferred that the thickness of each of the negative electrode active material layer 51 and the positive electrode active material layer 54 be from 5 μm to 20 μm. Further, it is preferred that the thickness of the solid electrolyte layer 55 be from 5 μm to 15 μm. It is preferred that the thickness of the elongated film 49 be from 50 μm to 200 μm.

As illustrated in FIG. 10 and FIG. 12, the dimension of the negative electrode current collector 50 in a width direction (direction orthogonal to the longitudinal direction) is set to be larger than the dimension of each of the negative electrode active material layer 51 and the solid electrolyte layer 55 in the width direction, and thus both ends of the negative electrode current collector 50 in the width direction extend off both ends of the negative electrode active material layer 51 and the solid electrolyte layer 55 in the width direction. In addition, the negative electrode current collector 50, the negative electrode active material layer 51, and the solid electrolyte layer 55 are not formed in a region having a predetermined length on a start side of unwinding of the elongated film 49, and those layers 50, 51, and 55 are not formed, either, in a region having a predetermined length on an end side of unwinding of the elongated film 49.

In the elongated base material 74 described above, at least one layer of the negative electrode active material layer 51 and the solid electrolyte layer 55 is not required to be formed by the application device 1 and the thermal drying device 73, and may be formed by screen printing, gravure printing, an inkjet application device and a drying device having other configurations, or the like. Even when the elongated base material 74 has any of the foregoing configurations, the negative electrode active material layer 51, the solid electrolyte layer 55, and the positive electrode active material layer 54 are formed on the elongated film 49, and then, the positive electrode current collector 53 is formed on the positive electrode active material layer 54 through adoption of the roll-to-roll system or the like. After that, the obtained elongated material is cut at intervals of a predetermined length to finally obtain the all-solid-state lithium battery as illustrated in FIG. 5.

In the above description, the negative electrode current collector 50 and the negative electrode active material layer 51 may be the positive electrode current collector 53 and the positive electrode active material layer 54, and the positive electrode current collector 53 and the positive electrode active material layer 54 may be the negative electrode current collector 50 and the negative electrode active material layer 51.

Figure 20:
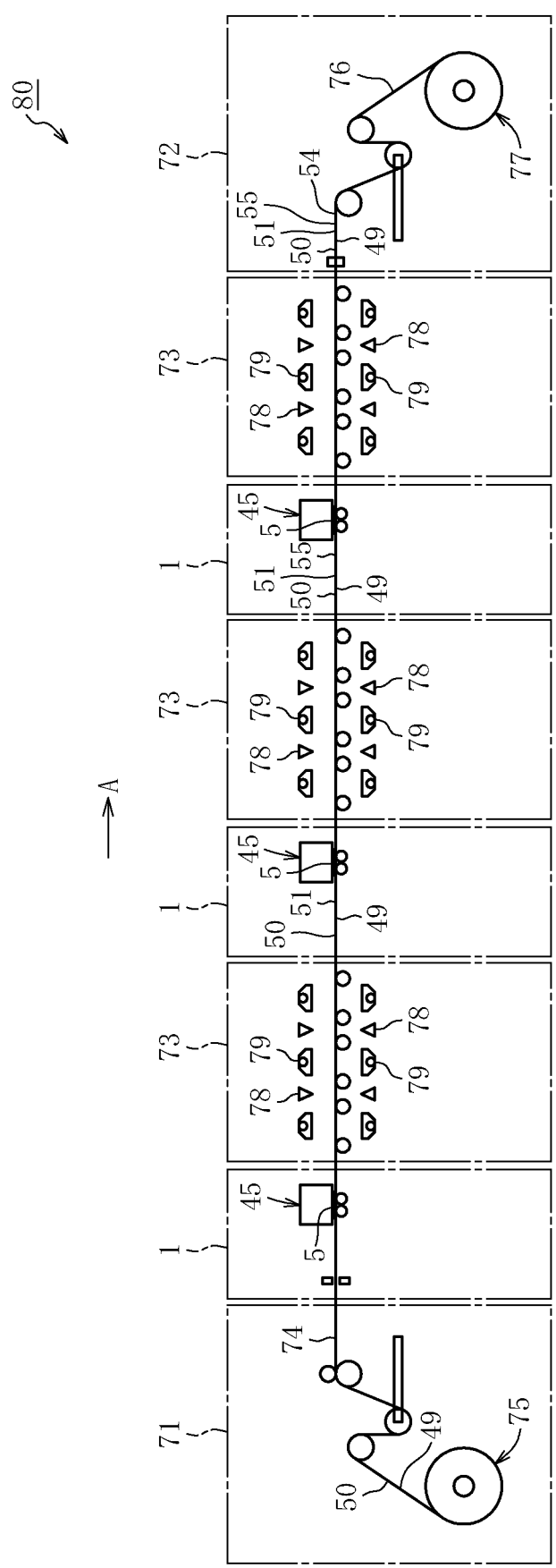
FIG. 20 is a schematic side view for illustrating a second example of the battery manufacturing apparatus constructed through use of the inkjet application device according to the first embodiment of the present invention.

FIG. 20 is a schematic side view for illustrating another battery manufacturing apparatus. As illustrated in FIG. 20, a battery manufacturing apparatus 80 is different from the battery manufacturing apparatus 70 in that the application device 1 and the thermal drying device 73 are provided at three positions along the conveyance direction between the unwinding device 71 and the winding device 72 in roll-to-roll. The configurations of the application device 1 and the thermal drying device 73 are the same as those of the application device 1 and the thermal drying device 73 in the battery manufacturing apparatus 70. Therefore, the configuration requirements common to both the apparatus 70 and 80 are denoted by the same reference symbols, and description thereof is omitted.

In the battery manufacturing apparatus 80 illustrated in FIG. 20, the elongated base material 74 unwound from the base material roll 75 comprises the elongated film 49 on which the negative electrode current collector 50 is formed. While the elongated base material 74 is conveyed in the lateral direction, the elongated base material 74 is subjected to application of the liquid material by the application device 1 and the drying action by the thermal drying device 73 with respect to the liquid material three times. Thus, the negative electrode active material layer 51 is formed on the negative electrode current collector 50 on the elongated base material 74 by the first application device 1 and thermal drying device 73 on a backward side (left side of FIG. 20) in the conveyance direction. The solid electrolyte layer 55 is formed on the negative electrode active material layer 51 by the second application device 1 and thermal drying device 73. The positive electrode active material layer 54 is formed on the solid electrolyte layer 55 by the third application device 1 and thermal drying device 73.

Figure 21:
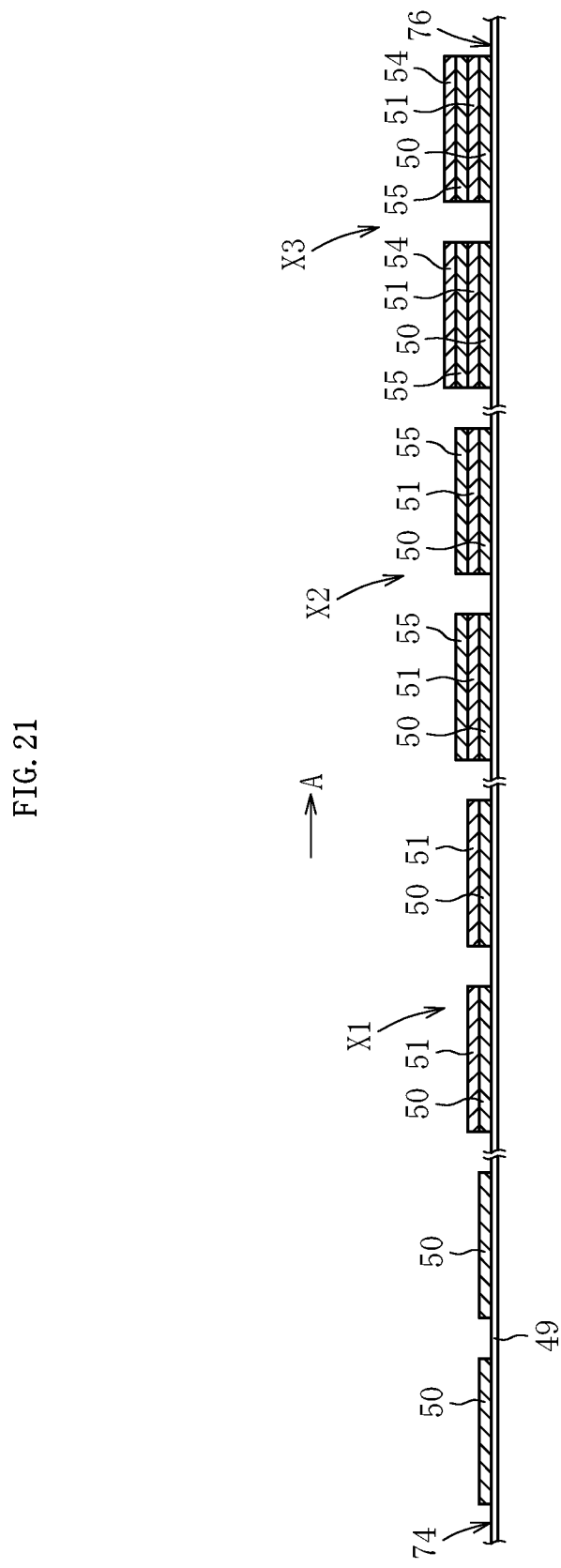
FIG. 21 is a schematic side view for illustrating a process in which a battery is manufactured in the second example of the battery manufacturing apparatus constructed through use of the inkjet application device according to the first embodiment of the present invention.

In this case, when the elongated base material 74 comprises the elongated film 49 on which the negative electrode current collectors 50 are formed intermittently in the longitudinal direction, the negative electrode active material layers 51 are sequentially formed on the negative electrode current collectors 50 by the first application device 1 and thermal drying device 73, as denoted by reference symbol X1 in FIG. 21. Then, the solid electrolyte layers 55 are formed on the negative electrode active material layers 51 by the second application device 1 and thermal drying device 73, as denoted by reference symbol X2 in FIG. 21. After that, the positive electrode active material layers 54 are formed on the solid electrolyte layers 55 by the third application device 1 and thermal drying device 73, as denoted by reference symbol X3 in FIG. 21. Thus, in this case, the laminate forming material 76 is obtained, in which the laminates each comprising the respective layers 50, 51, 55, and 54 are formed on the elongated film 49 intermittently in the longitudinal direction. The laminate forming material 76 is wound into a roll shape to obtain the winding roll 77.

Figure 22:
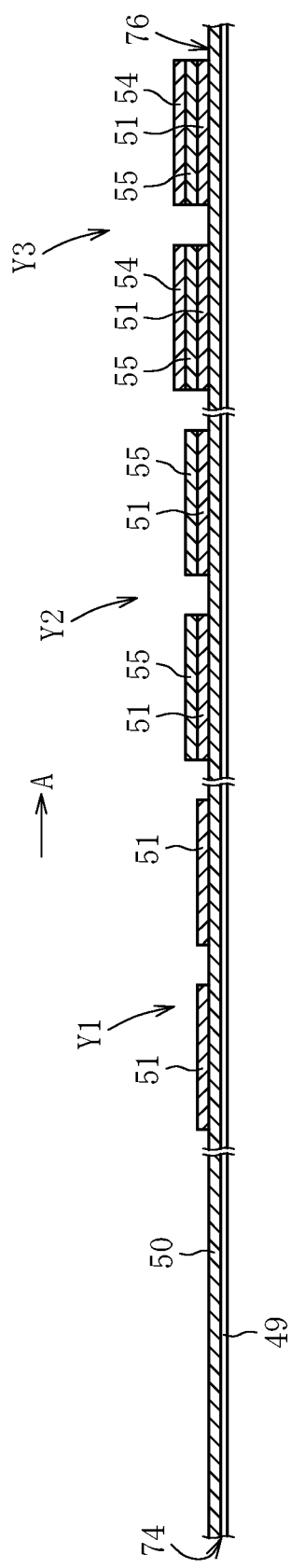
FIG. 22 is a schematic side view for illustrating the process in which the battery is manufactured in the second example of the battery manufacturing apparatus constructed through use of the inkjet application device according to the first embodiment of the present invention.

In addition, when the elongated base material 74 comprises the elongated film 49 on which the negative electrode current collector 50 is formed continuously in the longitudinal direction, it is preferred that each of the negative electrode active material layers 51 be sequentially formed on the continuous negative electrode current collector 50 intermittently by the first application device 1 and thermal drying device 73, as denoted by reference symbol Y1 in FIG. 22. Then, each of the solid electrolyte layers 55 is formed on each of the negative electrode active material layers 51 by the second application device 1 and thermal drying device 73, as denoted by reference symbol Y2 in FIG. 22. After that, each of the positive electrode active material layers 54 is formed on each of the solid electrolyte layers 55 by the third application device 1 and thermal drying device 73, as denoted by reference symbol Y3 in FIG. 22. Thus, in this case, the laminate forming material 76 is obtained, in which the laminate comprising the continuous negative electrode current collector 50 and the respective intermittent layers 51, 55, and 54 is formed on the elongated film 49 in the longitudinal direction.

Figure 23:
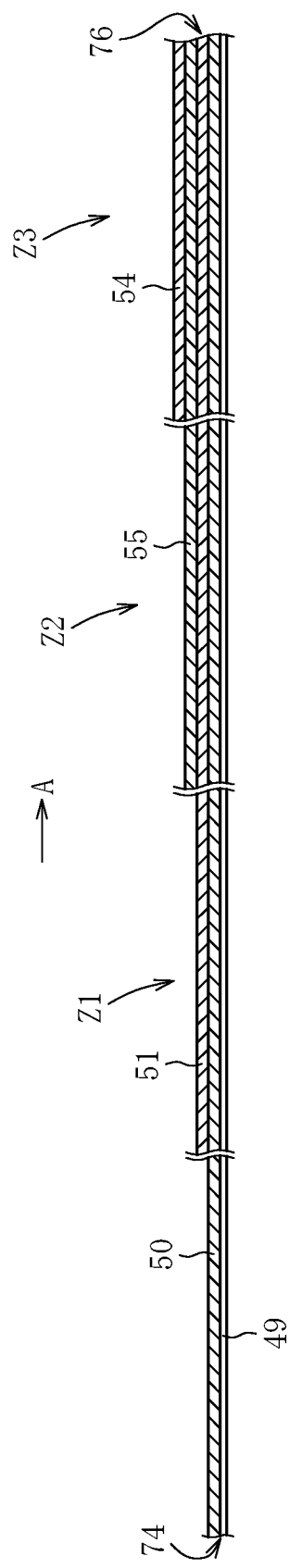
FIG. 23 is a schematic side view for illustrating the process in which the battery is manufactured in the second example of the battery manufacturing apparatus constructed through use of the inkjet application device according to the first embodiment of the present invention.

In addition, when the elongated base material 74 comprises the elongated film 49 on which the negative electrode current collector 50 is formed continuously in the longitudinal direction, the continuous negative electrode active material layers 51 may be formed on the continuous negative electrode current collector 50 by the first application device 1 and thermal drying device 73, as denoted by reference symbol Z1 in FIG. 23. Then, the continuous solid electrolyte layers 55 is formed on the continuous negative electrode active material layers 51 by the second application device 1 and thermal drying device 73, as denoted by reference symbol Z2 in FIG. 23. After that, the continuous positive electrode active material layers 54 is formed on the continuous solid electrolyte layers 55 by the third application device 1 and thermal drying device 73, as denoted by reference symbol Z3 in FIG. 23. Thus, in this case, the laminate forming material 76 is obtained, in which the laminate comprising the continuous negative electrode current collector 50 and the respective continuous layers 51, 55, and 54 is formed on the elongated film 49 in the longitudinal direction.

In the battery manufacturing apparatus 80 described above, the application device 1 and the thermal drying device 73 are used at three positions in the conveyance direction. However, a device configured to perform screen printing, a device configured to perform gravure printing, or an inkjet application device and a drying device having other configurations may be used at one position or two positions in the conveyance direction. After the laminate forming material, in which the negative electrode active material layer 51, the solid electrolyte layer 55, and the positive electrode active material layer 54 are formed on the elongated base material 74, is wound into a roll shape by the battery manufacturing apparatus 80, the positive electrode current collector 53 is further formed on the positive electrode active material layer 54 through adoption of the roll-to-roll system or the like. After that, the obtained elongated material is cut at intervals of a predetermined length to finally obtain the all-solid-state lithium battery as illustrated in FIG. 5.

Also in the above description, the negative electrode current collector 50 and the negative electrode active material layer 51 may be the positive electrode current collector 53 and the positive electrode active material layer 54, and the positive electrode current collector 53 and the positive electrode active material layer 54 may be the negative electrode current collector 50 and the negative electrode active material layer 51.

In addition, besides the foregoing, a procedure described below can be adopted. Specifically, the application device 1 and the thermal drying device 73 only at two positions of the three positions are used, or the application device 1 and the thermal drying device 73 are installed only at the two positions. As the elongated base material 74, an electrode sheet in which the negative electrode current collector 50 and the negative electrode active material layer 51 are formed on the elongated film 49 is used. While the electrode sheet that is the elongated base material 74 is conveyed in the lateral direction, the solid electrolyte layer 55 and the positive electrode active material layer 54 are formed through use of the application device 1 and the thermal drying device 73 at the two positions, to thereby manufacture the winding roll 77. Also in this case, the device configured to perform screen printing, the device configured to perform gravure printing, or the inkjet application device and the drying device having the other configurations may be used at one position of the two positions.

Figure 24:
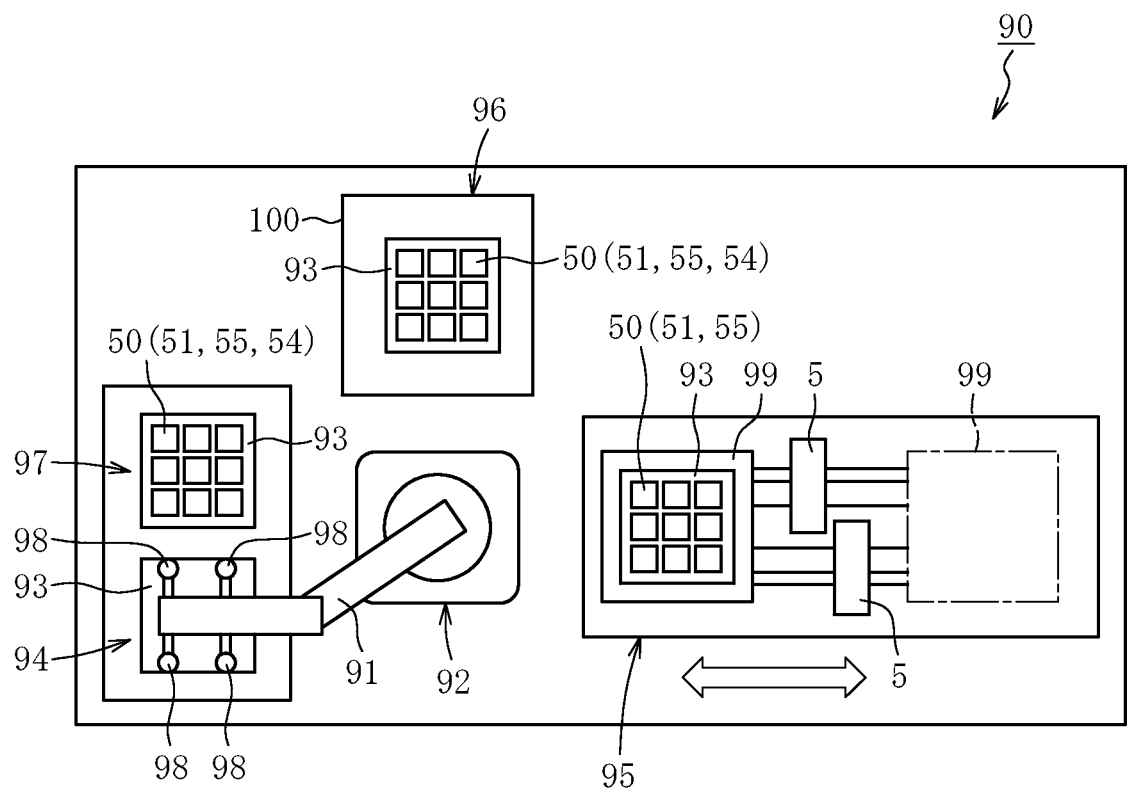
FIG. 24 is a schematic plan view for illustrating a third example of the battery manufacturing apparatus constructed through use of the inkjet application device according to the first embodiment of the present invention.
Figure 25:
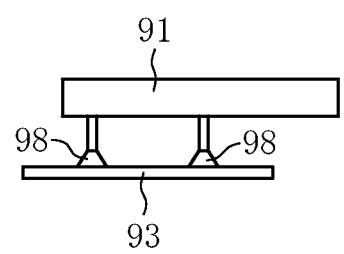
FIG. 25 is a schematic side view for illustrating some of components in the third example of the battery manufacturing apparatus constructed through use of the inkjet application device according to the first embodiment of the present invention.

FIG. 24 is a schematic plan view of a battery manufacturing apparatus 90 that adopts a sheet-fed system (system of performing treatment on sheets one by one). As illustrated in FIG. 24, the battery manufacturing apparatus 90 comprises a robot 92 having a robot hand 91. On the periphery of the robot 92, there are provided a taking-out portion 94, an inkjet application portion 95, a thermal drying portion 96, and an accommodating portion 97. The taking-out portion 94 is configured to take out the stacked sheets (substrates) 93 before treatment one by one. The inkjet application portion 95 is configured to apply the liquid materials serving as the forming materials for the negative electrode active material layer 51 and the solid electrolyte layer 55 to the negative electrode current collector 50 of the sheet 93 that has been taken out. The thermal drying portion 96 is configured to dry the liquid material on the sheet 93. The accommodating portion 97 is configured to stack and accommodate the sheets 93 after the treatment. The robot hand 91 can perform rotation movement, vertical movement, flexing and expanding movement, and the like, and a distal end portion of the robot hand 91 has a plurality of (four in the illustrated example) adsorption pads 98, which are configured to adsorb and hold the sheet 93, mounted thereon as illustrated in FIG. 25. Thus, as illustrated in FIG. 24, the robot hand 91 can load and unload the sheet 93 by absorbing and holding the sheet 93 in a horizontal posture with respect to the taking-out portion 94, the inkjet application portion 95, the thermal drying portion 96, and the accommodating portion 97. The adsorption pads 98 of the robot hand 91 are configured to adsorb and hold the sheet 93 so as not to interfere with the negative electrode current collector 50 and the layers 51 and 55 thereon.

The inkjet application portion 95 comprises a table 99 that can be slid in the right-and-left direction of FIG. 24 with the sheet 93 mounted thereon and a plurality of (two in the illustrated example) inkjet heads 5 arranged at fixed positions above the middle of a movement path of the table 99. Although not shown, the application device 1 is arranged in the inkjet application portion 95. In the inkjet application portion 95, the sheet 93 taken out from the taking-out portion 94 by the robot hand 91 is mounted on the table 99. While the table 99 is slid in the right direction from the left side of FIG. 24, the liquid materials serving as the forming materials for the negative electrode active material layer 51, the solid electrolyte layer 55, and the positive electrode active material layer 54 are applied to the negative electrode current collector 50 on the sheet 93. After application of the liquid materials, the table 99 is slid in the left direction of FIG. 24, and the robot hand 91 adsorbs and holds the sheet 93 on the table 99, to thereby load the sheet 93 into a thermal drying treatment chamber 100 of the thermal drying portion 96. Although not shown, the thermal drying device 73 is arranged in the thermal drying treatment chamber 100. When the applied liquid materials are dried in the thermal drying treatment chamber 100, the negative electrode active material layer 51, the solid electrolyte layer 55, and the positive electrode active material layer 54 are formed. After that, the robot hand 91 adsorbs and holds the sheet 93 and unloads the sheet 93 from the thermal drying treatment chamber 100, and then stacks the sheet 93 in the accommodating portion 97. Through repeated performance of the above-mentioned operation, a larger number of the treated sheets 93 are accommodated in the accommodating portion 97 in a stacked state. Also in this case, the negative electrode current collector 50 and the negative electrode active material layer 51 may be the positive electrode current collector 53 and the positive electrode active material layer 54. In addition, in the battery manufacturing apparatus 90, the liquid materials are dried in the thermal drying portion 96, but a reduced-pressure drying portion configured to perform reduced-pressure drying may be provided instead of or in addition to the thermal drying portion 96. Further, in the battery manufacturing apparatus 90, the robot hand 81 is used, but a substrate transfer machine of another system may be used.

Second Embodiment

Figure 26:
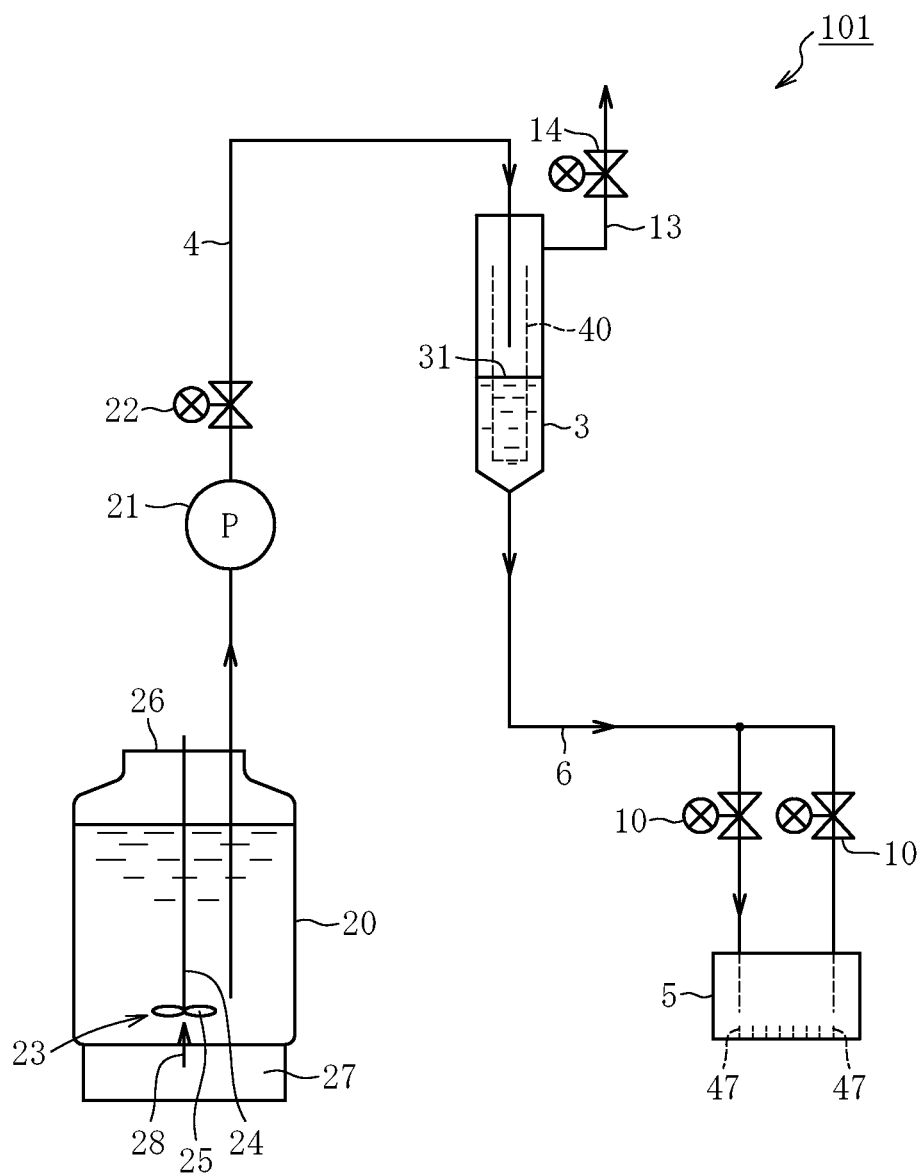
FIG. 26 is a schematic front view for illustrating an overall configuration of an inkjet application device according to a second embodiment of the present invention.

FIG. 26 is a schematic front view for illustrating an overall configuration of an inkjet application device (hereinafter simply referred to as "application device") according to a second embodiment of the present invention. An application device 101 according to the second embodiment is different from the application device 1 according to the first embodiment in that the feedback tank is not provided and hence a distribution flow path for the liquid material has a non-circulation system. Thus, the first flow channel 4 configured to supply the liquid material pumped with the pump 21 (auxiliary pump 21 in the first embodiment) to the supply tank 3 directly communicates to the source tank 20, and the second flow channel 6 configured to supply the liquid material from the supply tank 3 to the inkjet head 5 is branched into two portions halfway through to lead to the inkjet head 5. The detailed configurations of the supply tank 3 and the source tank 20 and the liquid material are the same as those in the first embodiment. In addition, the application device 101 can be applied to the battery manufacturing apparatus 70, 80, and 90 described above in the same manner as in the case of the first embodiment. Thus, in the application device 101, the configuration requirements common to the application device 1 according to the first embodiment and the application device 101 are denoted by the same reference symbols, and description thereof is omitted.

In the above-mentioned embodiments, the solid electrolyte layer 55 is directly formed on the negative electrode active material layer 51. However, through formation of the separator described above on the negative electrode active material layer 51, the solid electrolyte layer 55 may be formed on the negative electrode active material layer 51 through intermediation of the separator. Further, in the above-mentioned embodiments, the solid electrolyte layer 55 is directly formed on the positive electrode active material layer 54. However, through formation of the separator described above on the positive electrode active material layer 54, the solid electrolyte layer 55 may be formed on the positive electrode active material layer 54 through intermediation of the separator.

In addition, in the above-mentioned embodiments, as each of the liquid materials for forming the positive electrode active material layer 54, the solid electrolyte layer 55, and the negative electrode active material layer 51 that are components of a battery, the liquid material having particles dispersed therein is used. However, besides the foregoing, there may be used, for example, a liquid material containing barium titanate or nickel ultrafine powder that can be used in the field of a multilayer ceramic capacitor (MLCC) or the like, and an adhesive containing silica or the like that can be used in the fields of a semiconductor package, a printed wiring board, and the like. The maximum particle diameter of the particles in the liquid material in this case is also preferably from 1 µm to 10 µm, a lower limit value thereof being more preferably 3 µm, an upper limit value thereof being more preferably 7 µm, in the same manner as in the liquid materials in the cases described above.

Example 1

In an Example of the present invention, the performance of the mesh filter 40 accommodated in the supply tank 3 was tested. Therefore, in the present invention, the mesh filter 40 described above was adopted based on the test results in this Example.

Specifically, a liquid material having inorganic particles having a maximum particle diameter of about 5 µm dispersed therein was supplied to the distribution flow path of the application device 1 illustrated in FIG. 1 so that the circulation flow rate reached from 60 cc/min to 100 cc/min, and the circulation state of the liquid material and the effect of removing air bubbles were tested. In this case, the mesh number of the mesh filter 40 was variously changed. The wire diameter of the mesh filter 40 is from 0.03 mm to 0.09 mm. The test results thereof are shown in Table 1. In Table 1, reference symbol "○" denotes that the test results are extremely satisfactory; reference symbol "○Δ" denotes that the test results are satisfactory; reference symbol "Δ" denotes that the test results are substantially satisfactory; reference symbol "Δx" denotes that the test results are slightly unsatisfactory; and reference symbol "x" denotes that the test results are extremely unsatisfactory.

TABLE 1

| Filter mesh number | State of ink environment | Effect of removing air bubbles | Comprehensive determination |
|---|---|---|---|
| #1000 | x Abnormal circulation | — Impossible to confirm | x |
| #800 | Δ | ○ | Δ |
| #600 | ○Δ | ○ | ○Δ |
| #400 | ○ | ○ | ○ |
| #300 | ○ | ○Δ | ○Δ |
| #200 | ○ | x Passing of minute air bubbles | x |

It was found from Table 1 that the mesh number (or mesh size) is preferably from 300 to 800, more preferably from 300 to 600. Based on this finding, such mesh filter 40 was adopted in the present invention. When the inorganic particles had a maximum particle diameter within a range of from 3 μm to 7 μm, substantially the same results as those of the foregoing were obtained. When the inorganic particles had a maximum particle diameter within a range of from 1 μm to 10 μm, almost the same results as those of the foregoing were obtained.

REFERENCE SIGNS LIST 1 inkjet application device
2 pump
3 supply tank
4 first flow channel
5 inkjet head
6 second flow channel
7 feedback tank
8 third flow channel
9 fourth flow channel
15 liquid surface in feedback tank
17 negative pressure generator
19 fifth flow channel
20 source tank
23 stirrer
24 support bar
25 blade member
27 magnet
28 magnetic force
30 first pipe
31 liquid surface in supply tank
40 filter (mesh filter)
40b bottom portion of mesh filter
46 nozzle surface
47 nozzle hole
49 elongated film
50 negative electrode current collector
51 negative electrode active material layer
53 positive electrode current collector
54 positive electrode active material layer
55 solid electrolyte layer
60 meniscus
70 battery manufacturing apparatus
73 thermal drying device
74 elongated base material
74a coated portion
75 base material roll
76 laminate forming material
80 battery manufacturing apparatus
90 battery manufacturing apparatus
101 inkjet application device

The invention claimed is:

1. An inkjet application device, which is configured to apply a liquid material having particles dispersed therein through use of an inkjet head,
   the inkjet application device comprising a distribution flow path for the liquid material, the distribution flow path comprising a first flow channel configured to supply the liquid material pumped with a pump to a supply tank and a second flow channel configured to supply the liquid material in the supply tank to the inkjet head,
   wherein the supply tank accommodates a filter, the filter being configured to allow the particles in the liquid material to pass therethrough without allowing air bubbles in the liquid material, which are generated by the pumping of the pump, to pass therethrough,
   wherein a pipe forming the first flow channel is inserted up to a middle of an internal space of the supply tank in a vertical direction,
   wherein, in the supply tank, a vertical length of the internal space is larger than an inner diameter of the supply tank, and
   wherein, when an inner diameter of the pipe is represented by d1, and the inner diameter of the supply tank is represented by d2, d2/d1 is set to fall within a range of from 2 to 6.

2. An inkjet application device, which is configured to apply a liquid material having particles dispersed therein through use of an inkjet head,
   the inkjet application device comprising a distribution flow path for the liquid material, the distribution flow path comprising a first flow channel configured to supply the liquid material pumped with a pump to a supply tank and a second flow channel configured to supply the liquid material in the supply tank to the inkjet head,
   wherein the supply tank accommodates a filter, the filter being configured to allow the particles in the liquid material to pass therethrough without allowing air bubbles in the liquid material, which are generated by the pumping of the pump, to pass therethrough, and
   wherein, when an inner diameter of the supply tank is represented by d2, and a vertical length of an internal space of the supply tank is represented by L1, L1/d2 is set to fall within a range of from 4 to 12.

3. An inkjet application device, which is configured to apply a liquid material having particles dispersed therein through use of an inkjet head,
   the inkjet application device comprising a distribution flow path for the liquid material, the distribution flow path comprising a first flow channel configured to supply the liquid material pumped with a pump to a supply tank and a second flow channel configured to supply the liquid material in the supply tank to the inkjet head,
   wherein the supply tank accommodates a filter, the filter being configured to allow the particles in the liquid material to pass therethrough without allowing air bubbles in the liquid material, which are generated by the pumping of the pump, to pass therethrough, and
   wherein, when an inner diameter of the supply tank is represented by d2, and a height of a liquid surface of the liquid material in an internal space of the supply tank is represented by L2, L2/d2 is set to fall within a range of from 1.5 to 9.

4. The inkjet application device according to claim 2,
wherein the filter comprises a cylindrical mesh filter, which is accommodated in the internal space of the supply tank, and into which the liquid material supplied to the supply tank through the first flow channel flows, and
wherein the cylindrical mesh filter is configured to prevent the air bubbles in the liquid material from flowing out from an inner portion of the cylindrical mesh filter and cause the particles in the liquid material to flow out from the inner portion of the cylindrical mesh filter.

5. The inkjet application device according to claim 2, further comprising a third flow channel having a downstream end connected between the pump and the supply tank on the first flow channel,
wherein the third flow channel has an upstream end communicating to a source tank, which is configured to store a larger amount of the liquid material than each of the supply tank and a feedback tank, and
wherein the source tank accommodates a stirrer configured to stir the liquid material.

6. The inkjet application device according to claim 5,
wherein the stirrer comprises a blade member, which is arranged in the liquid material so as to be prevented from being brought into contact with the source tank, and is suspended and supported through a support bar, and
wherein the blade member is configured to stir the liquid material with a magnetic force of a magnet.

7. The inkjet application device according to claim 2, wherein the inkjet head has a nozzle surface subjected to water-repellent treatment.

8. The inkjet application device according to claim 2, wherein the particles are particles contained in a raw material for a layer in
one active material layer, which is formed on a negative electrode or positive electrode current collector, of a negative electrode active material layer and a positive electrode active material layer,
a solid electrolyte layer formed on the one active material layer, or
another active material layer, which is formed on the solid electrolyte layer, of the negative electrode active material layer and the positive electrode active material layer.

9. A battery manufacturing apparatus, which is configured to produce, through use of the inkjet application device of claim 8,
the one active material layer, which is formed on the negative electrode or positive electrode current collector, of the negative electrode active material layer and the positive electrode active material layer,
the solid electrolyte layer formed on the one active material layer, or
the another active material layer, which is formed on the solid electrolyte layer, of the negative electrode active material layer and the positive electrode active material layer.

10. A battery manufacturing apparatus, which is configured to:
apply a liquid material to an active material layer through use of the inkjet application device of claim 8 and dry the liquid material, to thereby form the solid electrolyte layer, while unwinding an elongated base material from a base material roll and conveying the elongated base material in a lateral direction,
wherein the base material roll has the elongated base material with flexibility wound in a roll shape, the elongated base material comprising an elongated film on which a current collector is formed, the negative electrode active material layer or the positive electrode active material layer being formed on the current collector; and
wind a laminate forming material into a roll shape, the laminate forming material having a laminate, which comprises the current collector, the negative electrode active material layer or the positive electrode active material layer, and the solid electrolyte layer, formed on the elongated film.

11. The inkjet application device according to claim 2, further comprising:
a third flow channel configured to feed back the liquid material supplied to the inkjet head through the second flow channel to a feedback tank;
a fourth flow channel configured to supply the liquid material from the feedback tank to the pump, to thereby form a circulation path for the liquid material; and
a negative pressure generator configured to apply a negative pressure to the feedback tank.

12. The inkjet application device according to claim 1,
wherein the filter comprises a cylindrical mesh filter, which is accommodated in the internal space of the supply tank, and into which the liquid material supplied to the supply tank through the first flow channel flows, and
wherein the cylindrical mesh filter is configured to prevent the air bubbles in the liquid material from flowing out from an inner portion of the cylindrical mesh filter and cause the particles in the liquid material to flow out from the inner portion of the cylindrical mesh filter.

13. The inkjet application device according to claim 1, further comprising a third flow channel having a downstream end connected between the pump and the supply tank on the first flow channel,
wherein the third flow channel has an upstream end communicating to a source tank, which is configured to store a larger amount of the liquid material than each of the supply tank and a feedback tank, and
wherein the source tank accommodates a stirrer configured to stir the liquid material.

14. The inkjet application device according to claim 13,
wherein the stirrer comprises a blade member, which is arranged in the liquid material so as to be prevented from being brought into contact with the source tank, and is suspended and supported through a support bar, and
wherein the blade member is configured to stir the liquid material with a magnetic force of a magnet.

15. The inkjet application device according to claim 1, wherein the inkjet head has a nozzle surface subjected to water-repellent treatment.

16. The inkjet application device according to claim 1, further comprising:
a third flow channel configured to feed back the liquid material supplied to the inkjet head through the second flow channel to a feedback tank;
a fourth flow channel configured to supply the liquid material from the feedback tank to the pump, to thereby form a circulation path for the liquid material; and
a negative pressure generator configured to apply a negative pressure to the feedback tank.

17. The inkjet application device according to claim 3,
wherein the filter comprises a cylindrical mesh filter, which is accommodated in the internal space of the supply tank, and into which the liquid material supplied to the supply tank through the first flow channel flows, and wherein the cylindrical mesh filter is configured to prevent the air bubbles in the liquid material from flowing out from an inner portion of the cylindrical mesh filter and cause the particles in the liquid material to flow out from the inner portion of the cylindrical mesh filter.

18. The inkjet application device according to claim 3, further comprising a third flow channel having a downstream end connected between the pump and the supply tank on the first flow channel, wherein the third flow channel has an upstream end communicating to a source tank, which is configured to store a larger amount of the liquid material than each of the supply tank and a feedback tank, and wherein the source tank accommodates a stirrer configured to stir the liquid material.

19. The inkjet application device according to claim 18,
wherein the stirrer comprises a blade member, which is arranged in the liquid material so as to be prevented from being brought into contact with the source tank, and is suspended and supported through a support bar, and wherein the blade member is configured to stir the liquid material with a magnetic force of a magnet.

20. The inkjet application device according to claim 3, further comprising:

a third flow channel configured to feed back the liquid material supplied to the inkjet head through the second flow channel to a feedback tank;

a fourth flow channel configured to supply the liquid material from the feedback tank to the pump, to thereby form a circulation path for the liquid material; and a negative pressure generator configured to apply a negative pressure to the feedback tank.

* * * * *